United States Patent
Paz et al.

(10) Patent No.: US 12,047,325 B2
(45) Date of Patent: Jul. 23, 2024

(54) DYNAMIC CODE BLOCK GROUP (CBG) ENABLING AND SIGNALING OF MAXIMAL NUMBER OF CBGs

(71) Applicant: QUALCOMM Incorporated, San Diego, CA (US)

(72) Inventors: Daniel Paz, Geva Carmel (IL); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 17/453,323

(22) Filed: Nov. 2, 2021

(65) Prior Publication Data
US 2023/0134718 A1    May 4, 2023

(51) Int. Cl.
*H04L 5/00* (2006.01)
*H04L 1/1812* (2023.01)
*H04W 72/21* (2023.01)

(52) U.S. Cl.
CPC .......... *H04L 5/0055* (2013.01); *H04L 1/1812* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 11,223,450 | B2 * | 1/2022 | Yeo | H04L 1/18 |
| 2018/0287752 | A1 * | 10/2018 | Park | H04L 5/0044 |
| 2018/0375634 | A1 * | 12/2018 | Sun | H04L 5/0055 |
| 2019/0158250 | A1 * | 5/2019 | Ang | H04L 5/0046 |
| 2019/0386782 | A1 * | 12/2019 | Yang | H04L 1/1819 |
| 2020/0008216 | A1 * | 1/2020 | Iyer | H04W 72/23 |
| 2020/0260486 | A1 | 8/2020 | Zhou et al. | |
| 2020/0396760 | A1 * | 12/2020 | Yi | H04L 1/1864 |

OTHER PUBLICATIONS

China Telecom: "Discussion on CBG-based (re)Transmission", 3GPP TSG RAN WG1 Meeting #90, R1-1714130, 3rd Generation Partnership Project, Mobile Competence Centre, 650, Route Des Lucioles, F-06921 Sophia-Antipolis Cedex, France, vol. RAN WG1, No. Prague, P.R. Czechia, Aug. 21, 2017-Aug. 25, 2017, Aug. 20, 2017, 3 Pages, XP051316919, Section 2—Discussion, p. 2.
International Search Report and Written Opinion—PCT/US2022/077595—ISA/EPO—Dec. 23, 2022.

* cited by examiner

*Primary Examiner* — Brian S Roberts
(74) *Attorney, Agent, or Firm* — Patterson+ Sheridan, L.L.P.

(57) ABSTRACT

Certain aspects of the present disclosure provide a method for wireless communication by a user equipment (UE). The UE receives, from a network entity, signaling dynamically enabling a code block group (CBG) configuration. The UE processes downlink (DL) transport blocks (TBs) including a number of CBGs, in accordance with the CBG configuration. The UE transmits, to the network entity, CBG-level acknowledgment information indicating results of the processing.

30 Claims, 24 Drawing Sheets

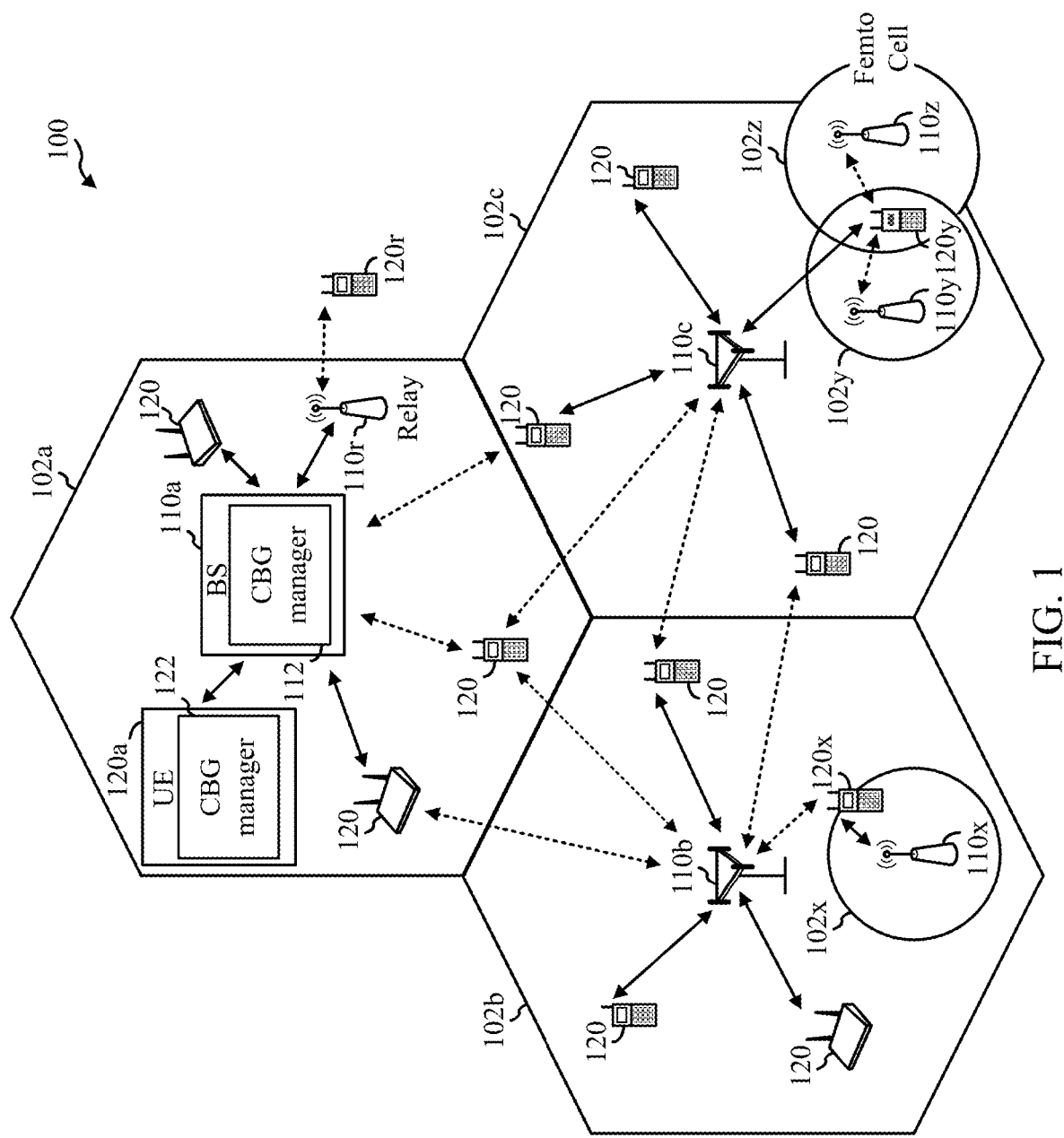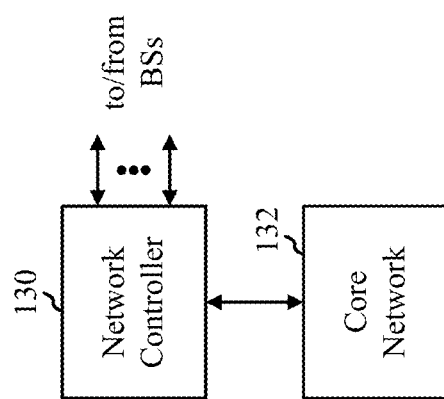
FIG. 1

| Parameter | Parameter Name | Remarks |
| --- | --- | --- |
| Precoding | Random | PRG = 4. |
| Demodulator | PSRD | |
| Channels | TDL_B | |
| Delay Spread (DS) | 100 ns | |
| Velocity (v) | 3/60/120/250 kmh | |
| DMRS config | 1/2/3 DMRS (Depending on v and DS) | No data multiplexing 2 DMRSs if v > 30kmh. \| 3 DMRSs if v > 120kmh |
| Modulation | Up to 256QAM | 256QAM enabled table. MCS = [0:2:26], Link adaption. |
| #Rx/#Tx/#SS | 4/4/(1,2,3,4) | Rank adaption. |
| PN | Not activated | |
| CHEST | Enabled | |
| BW | ~40 MHz \| ~20MHz | 100RBs \| 50RBs |
| Numerology | 1 | 30KHs SCS |
| SNR Range | [-4:2:46] dB | [0:2:26], Full rank adaption. |
| HARQ | 8 HARQ Processes max re Tx = 3 | Channel refresh every 32 sf. |

FIG. 10

DYNAMIC CODE BLOCK GROUP (CBG) ENABLING AND SIGNALING OF MAXIMAL NUMBER OF CBGs

BACKGROUND

Field of the Disclosure

Aspects of the present disclosure relate to wireless communications, and more particularly, to techniques for dynamically managing a code block group (CBG) configuration.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved and desirable techniques for dynamically managing a code block group (CBG) configuration.

Certain aspects of the subject matter described in this disclosure can be implemented in a method for wireless communications by a user equipment (UE). The method generally includes receiving, from a network entity, signaling dynamically enabling a CBG configuration; processing downlink (DL) transport blocks (TBs) comprising a number of CBGs, in accordance with the CBG configuration; and transmitting, to the network entity, CBG-level acknowledgment information indicating results of the processing.

Certain aspects of the subject matter described in this disclosure can be implemented in an apparatus for wireless communications by a UE. The apparatus generally includes at least one application processor and a memory configured to: receive, from a network entity, signaling dynamically enabling a CBG configuration; process DL TBs comprising a number of CBGs, in accordance with the CBG configuration; and transmit, to the network entity, CBG-level acknowledgment information indicating results of the processing.

Certain aspects of the subject matter described in this disclosure can be implemented in an apparatus for wireless communications by a UE. The apparatus generally includes means for receiving, from a network entity, signaling dynamically enabling a CBG configuration; means for processing DL TBs comprising a number of CBGs, in accordance with the CBG configuration; and means for transmitting, to the network entity, CBG-level acknowledgment information indicating results of the processing.

Certain aspects of the subject matter described in this disclosure can be implemented in a computer readable medium storing computer executable code thereon for wireless communications by a UE. The computer readable medium generally includes code for receiving, from a network entity, signaling dynamically enabling a CBG configuration; code for processing DL TBs comprising a number of CBGs, in accordance with the CBG configuration; and code for transmitting, to the network entity, CBG-level acknowledgment information indicating results of the processing.

Certain aspects of the subject matter described in this disclosure can be implemented in a method for wireless communications by a UE. The method generally includes receiving, from a network entity, signaling dynamically enabling a CBG configuration; transmitting, to the network entity, uplink (UL) TBs comprising a number of CBGs, in accordance with the CBG configuration; and receiving, from the network entity, CBG-level acknowledgment information indicating results of processing of the UL TBs by the network entity.

Certain aspects of the subject matter described in this disclosure can be implemented in an apparatus for wireless communications by a UE. The apparatus generally includes at least one application processor and a memory configured to: receive, from a network entity, signaling dynamically enabling a CBG configuration; transmit, to the network entity, UL TBs comprising a number of CBGs, in accordance with the CBG configuration; and receive, from the network entity, CBG-level acknowledgment information indicating results of processing of the UL TBs by the network entity.

Certain aspects of the subject matter described in this disclosure can be implemented in an apparatus for wireless communications by a UE. The apparatus generally includes means for receiving, from a network entity, signaling dynamically enabling a CBG configuration; means for transmitting, to the network entity, UL TBs comprising a number of CBGs, in accordance with the CBG configuration; and means for receiving, from the network entity, CBG-level acknowledgment information indicating results of processing of the UL TBs by the network entity.

Certain aspects of the subject matter described in this disclosure can be implemented in a computer readable medium storing computer executable code thereon for wireless communications by a UE. The computer readable medium generally includes code for receiving, from a network entity, signaling dynamically enabling a CBG configuration; code for transmitting, to the network entity, UL TBs comprising a number of CBGs, in accordance with the CBG configuration; and code for receiving, from the network entity, CBG-level acknowledgment information indicating results of processing of the UL TBs by the network entity.

Certain aspects of the subject matter described in this disclosure can be implemented in a method for wireless communications by a network entity. The method generally includes transmitting, to a UE, signaling dynamically enabling a CBG configuration; transmitting, to the UE, DL TBs comprising a number of CBGs, in accordance with the CBG configuration; and receiving, from the UE, CBG-level acknowledgment information indicating results of processing of the DL TBs by the UE.

Certain aspects of the subject matter described in this disclosure can be implemented in an apparatus for wireless communications by a network entity. The apparatus generally includes at least one application processor and a memory configured to: transmit, to a UE, signaling dynamically enabling a CBG configuration; transmit, to the UE, DL TBs comprising a number of CBGs, in accordance with the CBG configuration; and receive, from the UE, CBG-level acknowledgment information indicating results of processing of the DL TBs by the UE.

Certain aspects of the subject matter described in this disclosure can be implemented in an apparatus for wireless communications by a network entity. The apparatus generally includes means for transmitting, to a UE, signaling dynamically enabling a CBG configuration; means for transmitting, to the UE, DL TBs comprising a number of CBGs, in accordance with the CBG configuration; and means for receiving, from the UE, CBG-level acknowledgment information indicating results of processing of the DL TBs by the UE.

Certain aspects of the subject matter described in this disclosure can be implemented in a computer readable medium storing computer executable code thereon for wireless communications by a network entity. The computer readable medium generally includes code for transmitting, to a UE, signaling dynamically enabling a CBG configuration; code for transmitting, to the UE, DL TBs comprising a number of CBGs, in accordance with the CBG configuration; and code for receiving, from the UE, CBG-level acknowledgment information indicating results of processing of the DL TBs by the UE.

Certain aspects of the subject matter described in this disclosure can be implemented in a method for wireless communications by a network entity. The method generally includes transmitting, to a UE, signaling dynamically enabling a CBG configuration; processing UL TBs comprising a number of CBGs, in accordance with the CBG configuration; and transmitting, to the UE, CBG-level acknowledgment information indicating results of the processing.

Certain aspects of the subject matter described in this disclosure can be implemented in an apparatus for wireless communications by a network entity. The apparatus generally includes at least one application processor and a memory configured to: transmit, to a UE, signaling dynamically enabling a CBG configuration; process UL TBs comprising a number of CBGs, in accordance with the CBG configuration; and transmit, to the UE, CBG-level acknowledgment information indicating results of the processing.

Certain aspects of the subject matter described in this disclosure can be implemented in an apparatus for wireless communications by a network entity. The apparatus generally includes means for transmitting, to a UE, signaling dynamically enabling a CBG configuration; means for processing UL TBs comprising a number of CBGs, in accordance with the CBG configuration; and means for transmitting, to the UE, CBG-level acknowledgment information indicating results of the processing.

Certain aspects of the subject matter described in this disclosure can be implemented in a computer readable medium storing computer executable code thereon for wireless communications by a network entity. The computer readable medium generally includes code for transmitting, to a UE, signaling dynamically enabling a CBG configuration; code for processing UL TBs comprising a number of CBGs, in accordance with the CBG configuration; and code for transmitting, to the UE, CBG-level acknowledgment information indicating results of the processing.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIG. 1 is a block diagram conceptually illustrating an example wireless communication network, in accordance with certain aspects of the present disclosure.

FIG. 10 illustrates example parameters for determining CBG-based system gain over a system with no CBG configuration, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 2:
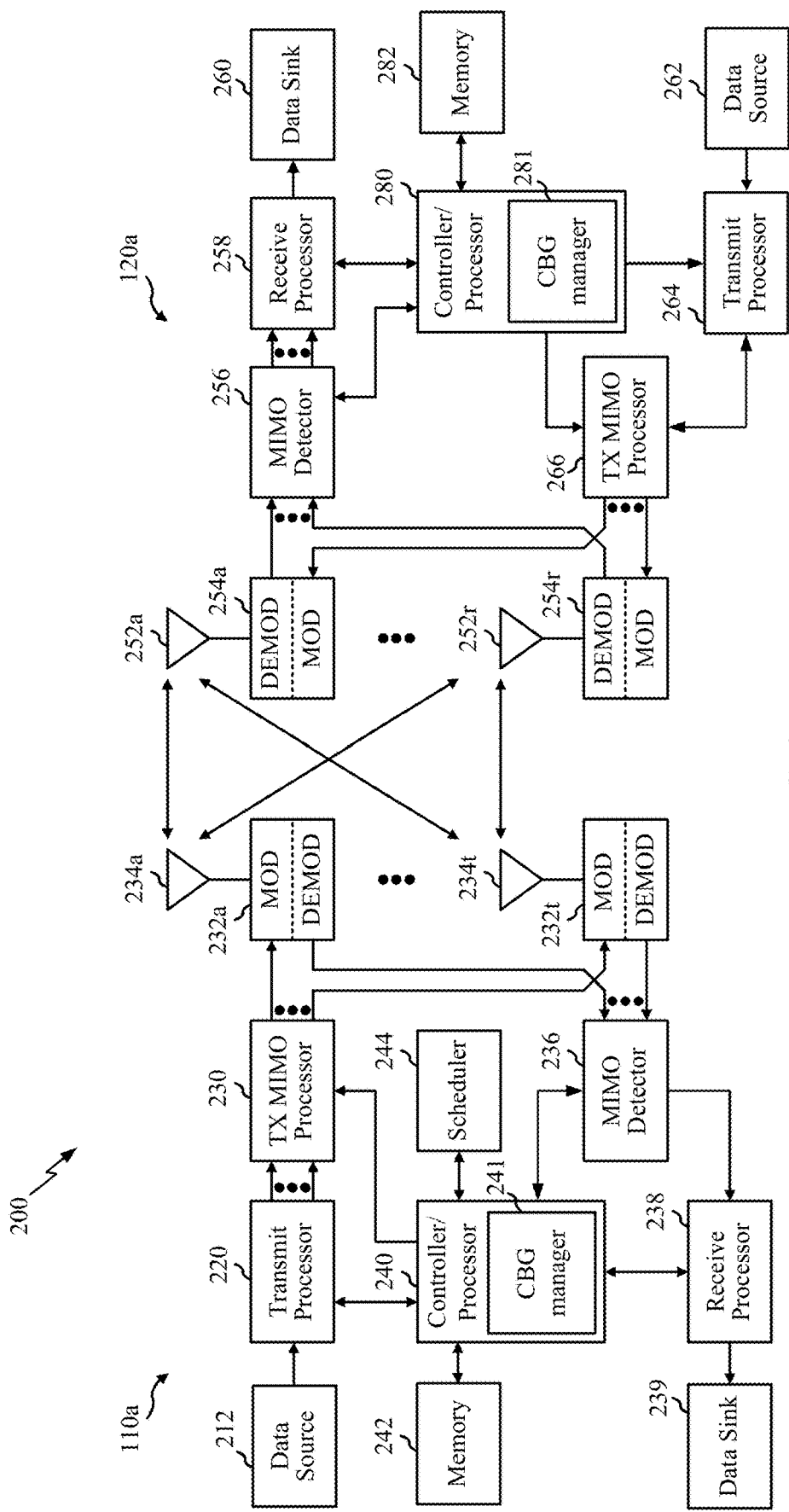
FIG. 2 is a block diagram conceptually illustrating a design of an example base station (BS) and a user equipment (UE), in accordance with certain aspects of the present disclosure.

Aspects of the present disclosure provide apparatuses, methods, processing systems, and computer readable mediums for dynamically managing a code block group (CBG) configuration. For example, techniques described herein may be implemented to dynamically enable/disable the CBG configuration and signal a maximum number of CGBs per transport block (TB), in order to improve an applicability of a CBG-based system, while avoiding excessive signaling overhead and scheduling complexity for scenarios in which the CBG-based system brings less value in terms of increased spectral efficiency.

In some cases, a network entity may configure enabling/disabling of a CBG configuration and a maximum number of CBGs per TB via a radio resource control (RRC) configuration. In such cases, the network entity can reconfigure the enabling/disabling of the CBG configuration and the maximum number of CBGs per TB only via RRC reconfiguration (as there is no dynamic signaling available). However, the RRC reconfiguration procedure has several drawbacks. For example, the RRC reconfiguration is a non-synchronous procedure, which may involve a high latency and cannot be implemented "on the fly" without introducing some delay (e.g., a physical downlink shared channel (PDSCH) interruption). Moreover, a dynamic RRC based reconfiguration (activation or deactivation) of a CBG-based system is practically not possible.

By providing an adaptive and dynamic CBG usage approach, instead of non-synchronous RRC-based CBG configuration procedure, aspects of the present disclosure may enable CBG-based processing when meaningful gain is expected and with a most adequate maximum number of CBGs. The adaptation and enabling of the CBG-based system may be based on different channel and allocation parameters, such as, an allocation size, a signal to noise ratio (SNR), a modulation and coding scheme (MCS), a rank indicator (RI), a channel Doppler spread and/or a delay spread. The techniques described herein may help improve CBG-based system applicability for a wider portfolio of use-cases and scenarios.

The following description provides examples of dynamic CBG enabling and signaling of maximal number of CGBs in wireless communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with $3^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120 configured for managing a code block group (CBG) configuration. As shown in FIG. 1, a UE 120a includes a CBG manager 122 configured to perform operations 500 of FIG. 5 and operations 600 of FIG. 6, and a BS 110a includes a CBG manager 112 configured to perform operations 700 of FIG. 7 and operations 800 of FIG. 8.

The wireless communication network 100 may be a new radio (NR) system (e.g., a 5th generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control—control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a CBG manager 241 that may be configured to perform the operations illustrated in FIG. 7 and FIG. 8, as well as other operations disclosed herein. As shown in FIG. 2, the controller/processor 280 of the UE 120a has a CBG manager 281 that may be configured to perform the operations illustrated in FIG. 5 and FIG. 6, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into sub-bands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
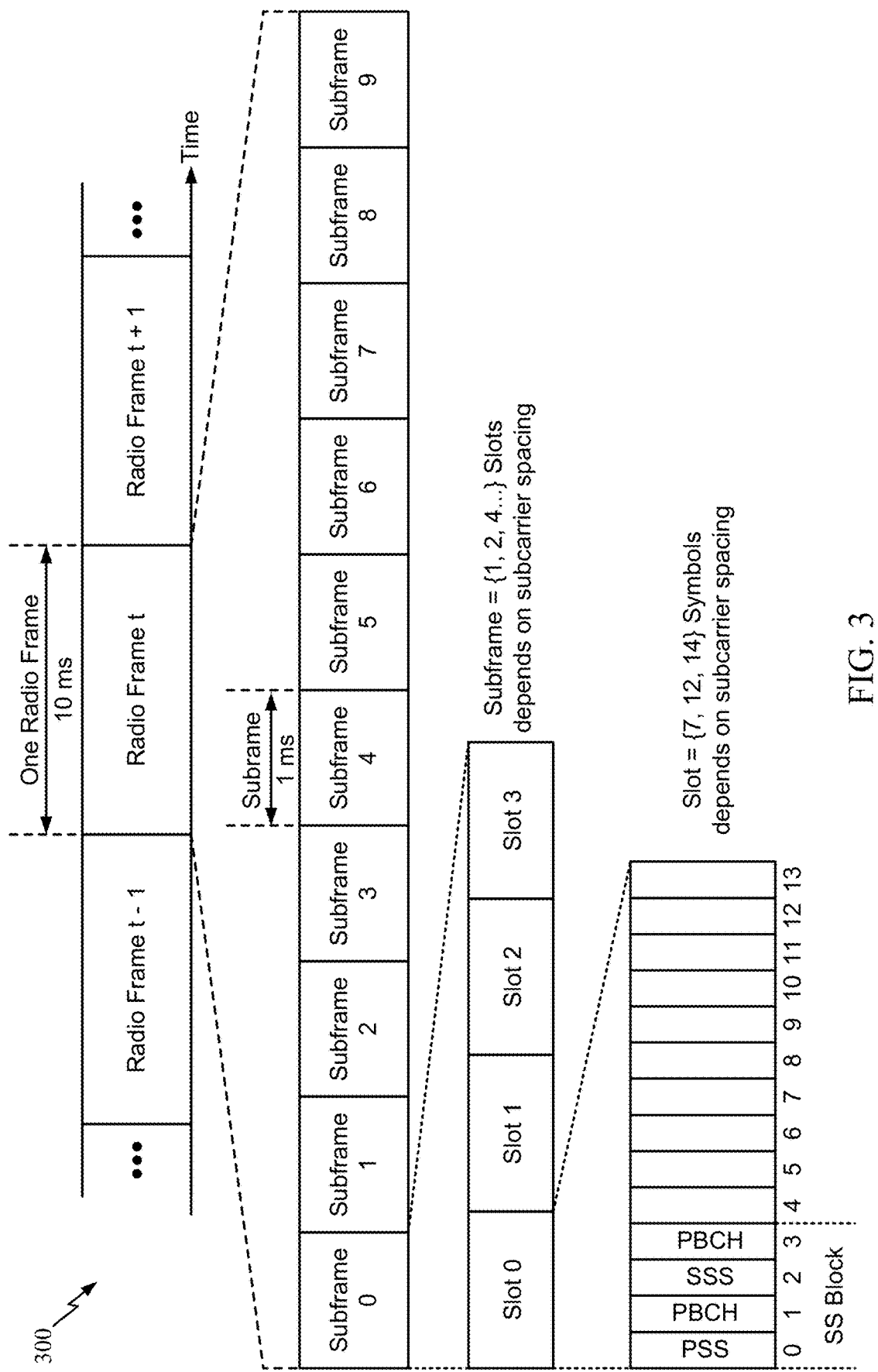
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example Code Block Group (CBG)

A transport block (TB) may be transmitted with a target block error rate. Block error rate refers to a ratio of a number of erroneous blocks received to a total number or blocks sent. An erroneous block refers to the TB for which a cyclic redundancy check (CRC) is wrong. If the target block error rate for a transmission is exceeded, an entire TB is retransmitted.

In new radio (NR) systems, larger TBs are utilized, and retransmission of these larger TBs may lead to inefficiencies. Accordingly, in some cases, a TB may be split into smaller sized code blocks (CBs), which are combined to form code block groups (CBGs). CBG-based transmissions provide for enhanced efficiency and improved latency in a communication system, by allowing a user equipment (UE) to decode the CBGs and send hybrid automatic retransmission request (HARD) feedback on a CBG level.

A number of CBs per CBG may be dynamically defined. In one example, the number of CBs per CBG is defined based on a configuration of a maximum number of CBGs per TB. In another example, the number of CBs per CBG is defined based on an allocation scenario.

Figure 4:
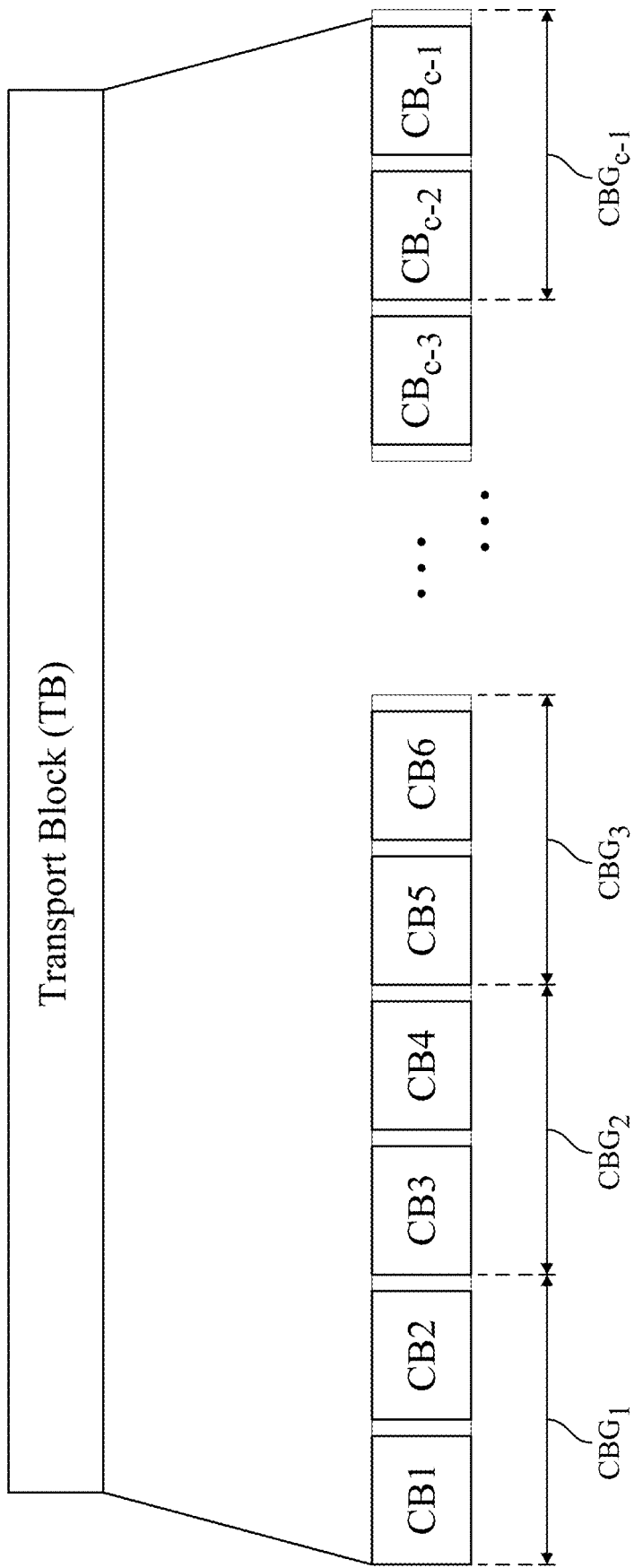
FIG. 4 illustrates example code block groups (CBGs) within a transport block (TB), in accordance with certain aspects of the present disclosure.

As illustrated in FIG. 4, a TB is split into CBs (e.g. $CB_1$, $CB_2$ $CB_3$, . . . $CB_{c-1}$). Some of the consecutive CBs are combined to form a CBG (e.g., based on an allocation scenario and/or a maximum number of CBGs per TB). For example, $CB_1$ and $CB_2$ are combined to form $CBG_1$; $CB_3$ and $CB_4$ are combined to form $CBG_2$; $CB_5$ and $CB_6$ are combined to form $CBG_3$, etc. In other examples, different combinations of CBs may be combined to form each CBG.

In this illustrated example, acknowledgement (ACK)/negative acknowledgement (NACK) for delivery of each CBG may be provided (e.g., by checking CRC at a CBG level). For example, $CBG_1$ and $CBG_2$ may be transmitted, pass CRC and be ACK'd, while $CBG_3$ may fail CRC and be NACK'd. This would necessitate retransmission of failed $CBG_3$ only (rather than an entire TB). Accordingly, a CBG-based system has some advantages (e.g., high efficiency since there is no need to retransmit the entire TB due to CRC failure associated with some CBs).

However, when the CBG-based system is enabled, it may also lead to an increased uplink control information (UCI) signaling overhead (e.g., due to ACK/NACK signaling per CBG), increased downlink control information (DCI) signaling overhead (e.g., due to per CBG signaling of new data indicators), and an increased scheduling complexity at a network entity. The new data indicators may include CBG transmission information (CBGTI) and CBG flushing out information (CBGFI). Accordingly, due to the scheduling complexity and the signaling overhead associated with the CBG-based system, there is less use of the CBG-based system in current deployments, even though CBG-based transmissions can bring a significant throughput (TPUT) gain in some scenarios.

Example Dynamic CBG Enabling and Signaling of Maximal Number of CBGs

Aspects of the present disclosure provide apparatuses, methods, processing systems, and computer readable mediums for dynamically managing a code block group (CBG) configuration, to avoid an excessive scheduling complexity and signaling overhead related to a CBG-based system.

For example, techniques described herein may dynamically enable/disable a CBG configuration and signal a maximal number of CGBs, to improve an applicability of a CBG-based system, while avoiding excessive scheduling complexity and signaling overhead for scenarios in which the CBG-based system brings less value in terms of increased spectral efficiency. The techniques described herein may provide a better tradeoff between a potential gain from CBG-based system activation and signaling overhead/scheduling complexity associated with the CBG-based system.

Figure 5:
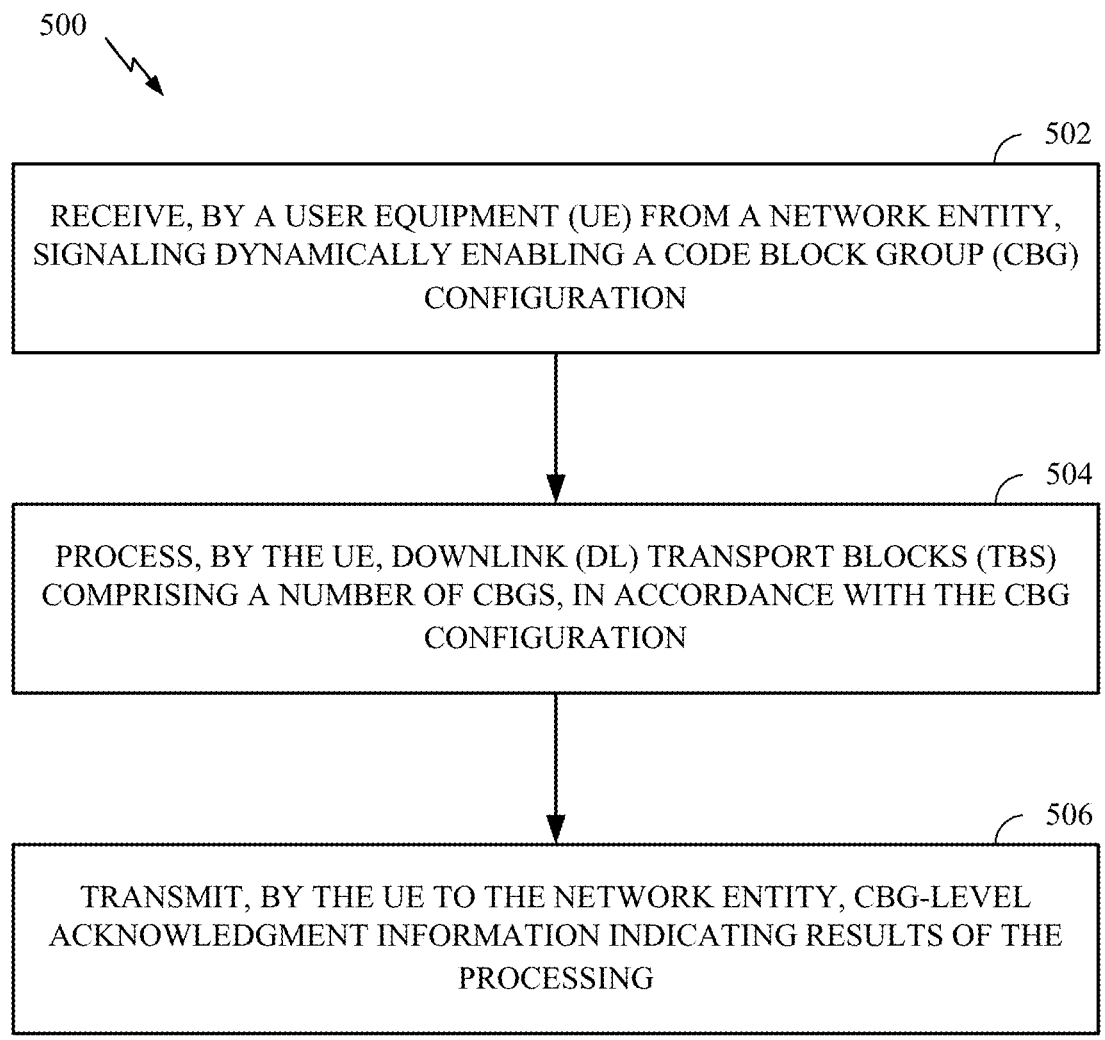
FIG. 5 is a flow diagram illustrating example operations for wireless communications by a UE, in accordance with certain aspects of the present disclosure.

FIG. 5 is a flow diagram illustrating example operations 500 for wireless communication by a UE, in accordance with certain aspects of the present disclosure. The operations 500 may be performed, for example, by the UE 120a in the wireless communication network 100. The operations 500 may be implemented as software components that are executed and run on one or more processors (e.g., the controller/processor 280 of FIG. 2). Further, the transmission and reception of signals by the UE in operations 500 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 500 begin, at 502, receiving, from a network entity, signaling dynamically enabling a CBG configuration. For example, the UE may receive the signaling dynamically enabling the CBG configuration from the network entity using antenna(s) and receiver/transceiver components of the UE 120a shown in FIG. 1 or FIG. 2 and/or of the apparatus shown in FIG. 21.

At 504, the UE processes downlink (DL) TBs comprising a number of CBGs, in accordance with the CBG configuration. For example, the UE may process the DL TBs, in accordance with the CBG configuration, using a processor, antenna(s) and/or transceiver components of the UE 120a shown in FIG. 1 or FIG. 2 and/or of the apparatus shown in FIG. 21.

At 506, the UE transmits, to the network entity, CBG-level acknowledgment information indicating results of the processing. For example, the UE may transmit the CBG-level acknowledgment information to the network entity using antenna(s) and transmitter/transceiver components of the UE 120a shown in FIG. 1 or FIG. 2 and/or of the apparatus shown in FIG. 21.

Figure 6:
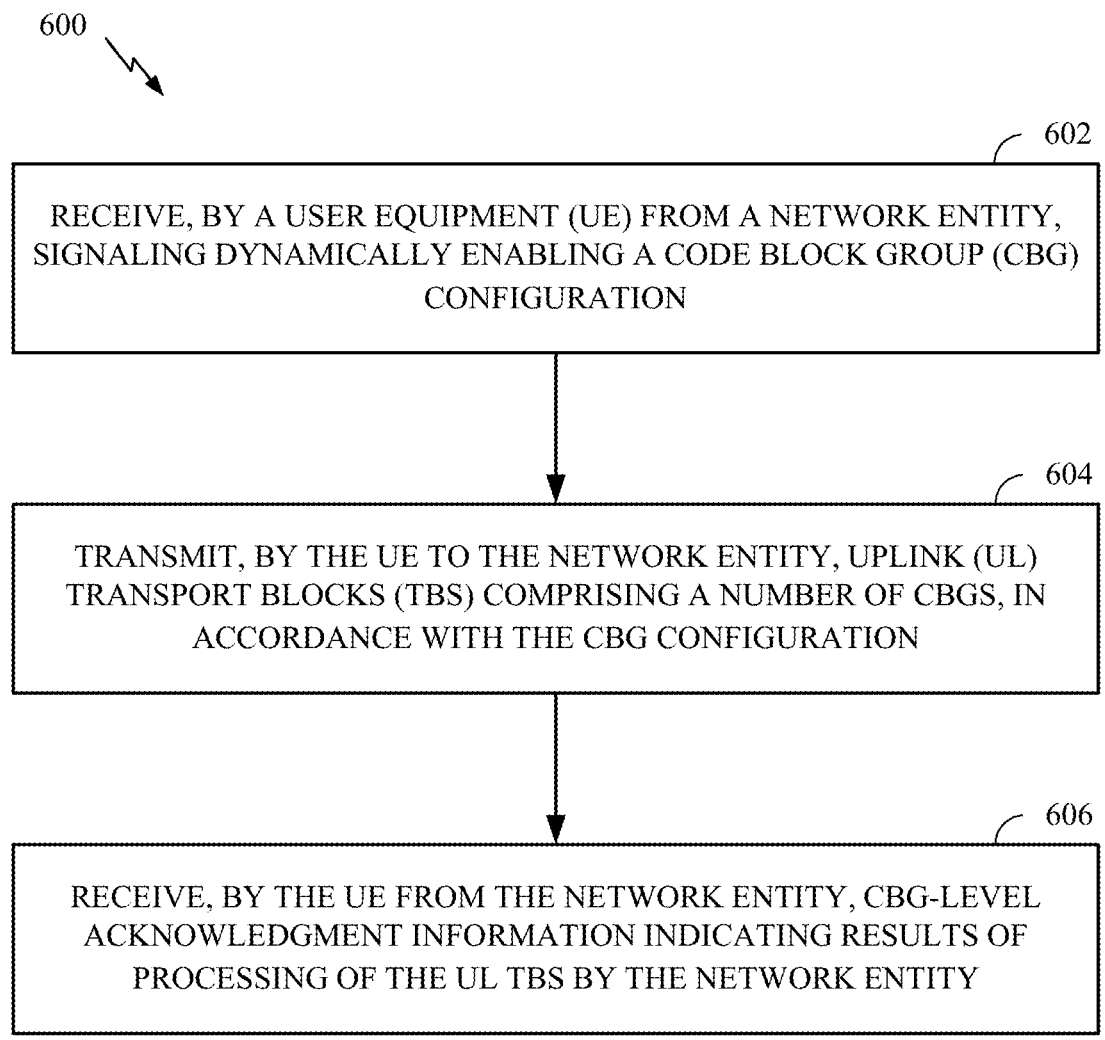
FIG. 6 is a flow diagram illustrating example operations for wireless communications by a UE, in accordance with certain aspects of the present disclosure.

FIG. 6 is a flow diagram illustrating example operations 600 for wireless communication by a UE, in accordance with certain aspects of the present disclosure. The operations 600 may be performed, for example, by the UE 120a in the wireless communication network 100. The operations 600 may be implemented as software components that are executed and run on one or more processors (e.g., the controller/processor 280 of FIG. 2). Further, the transmission and reception of signals by the UE in operations 600 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 600 begin, at 602, receiving, from a network entity, signaling dynamically enabling a CBG configuration. For example, the UE may receive the signaling dynamically enabling the CBG configuration from the network entity using antenna(s) and receiver/transceiver components of the UE 120a shown in FIG. 1 or FIG. 2 and/or of the apparatus shown in FIG. 22.

At 604, the UE transmits, to the network entity, uplink (UL) TBs comprising a number of CBGs, in accordance with the CBG configuration. For example, the UE may transmit the UL TBs, in accordance with the CBG configuration, to the network entity using antenna(s) and transmitter/transceiver components of the UE 120a shown in FIG. 1 or FIG. 2 and/or of the apparatus shown in FIG. 22.

At 606, the UE receives, from the network entity, CBG-level acknowledgment information indicating results of processing of the UL TBs by the network entity. For example, the UE may receive the CBG-level acknowledgment information from the network entity using antenna(s) and receiver/transceiver components of the UE 120a shown in FIG. 1 or FIG. 2 and/or of the apparatus shown in FIG. 22.

Figure 7:
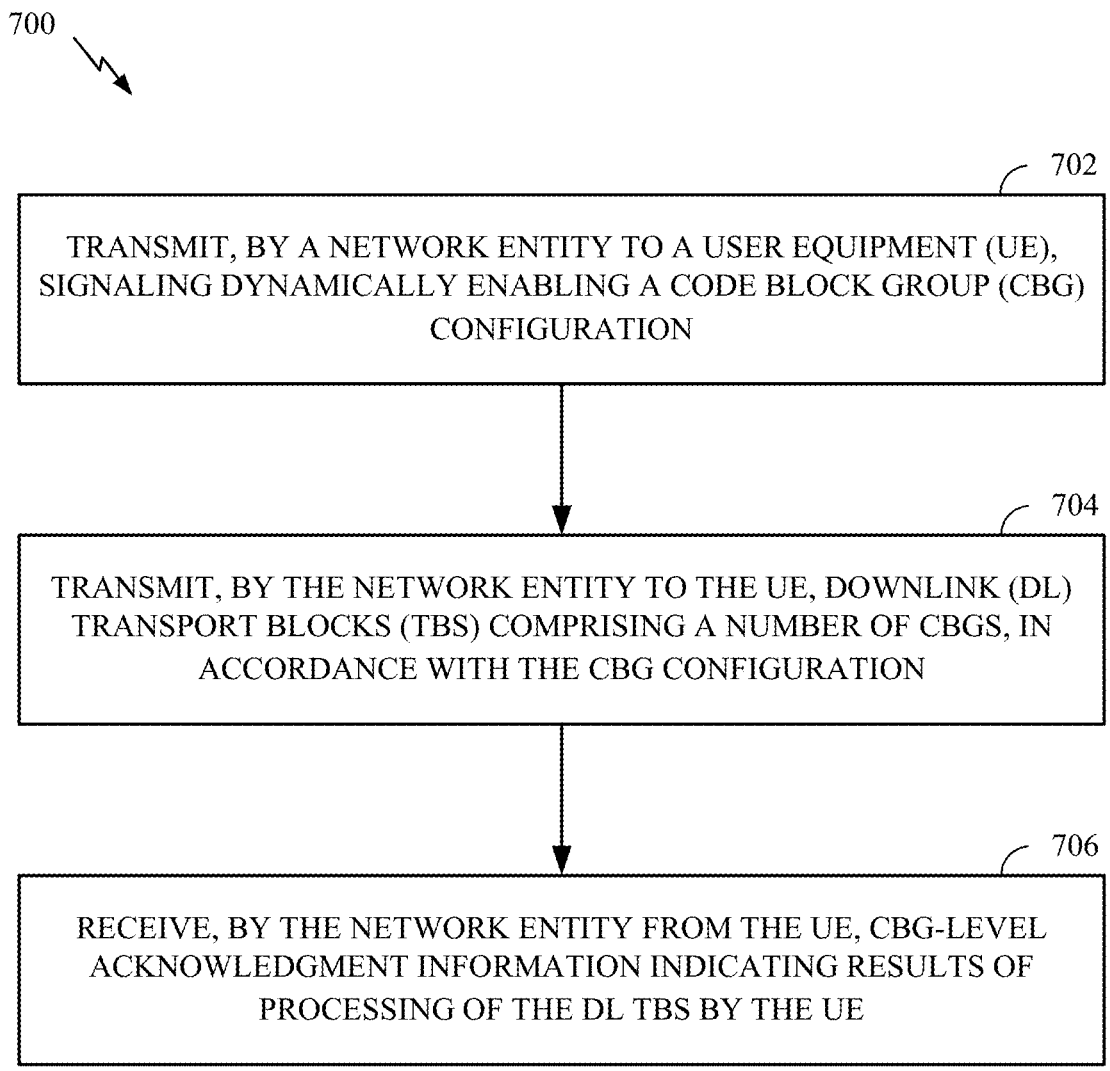
FIG. 7 is a flow diagram illustrating example operations for wireless communications by a network entity, in accordance with certain aspects of the present disclosure.

FIG. 7 is a flow diagram illustrating example operations 700 for wireless communication by a network entity, in accordance with certain aspects of the present disclosure. The operations 700 may be performed, for example, by a network entity (e.g., such as the BS 110a in the wireless communication network 100). The operations 700 may be implemented as software components that are executed and run on one or more processors (e.g., the controller/processor 240 of FIG. 2). Further, the transmission and reception of signals by the network entity in operations 700 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 700 begin, at 702, by transmitting, to a UE, signaling dynamically enabling a CBG configuration. For example, the network entity may transmit the signaling dynamically enabling the CBG configuration to the UE using antenna(s) and transmitter/transceiver components of the BS 110a shown in FIG. 1 or FIG. 2 and/or of the apparatus shown in FIG. 23.

At 704, the network entity transmits, to the UE, DL TBs comprising a number of CBGs, in accordance with the CBG configuration. For example, the network entity may transmit the DL TBs, in accordance with the CBG configuration, to the UE using antenna(s) and transmitter/transceiver components of the BS 110a shown in FIG. 1 or FIG. 2 and/or of the apparatus shown in FIG. 23.

At 706, the network entity receives, from the UE, CBG-level acknowledgment information indicating results of processing of the DL TBs by the UE. For example, the network entity may receive the CBG-level acknowledgment information from the UE using antenna(s) and receiver/transceiver components of the BS 110a shown in FIG. 1 or FIG. 2 and/or of the apparatus shown in FIG. 23.

Figure 8:
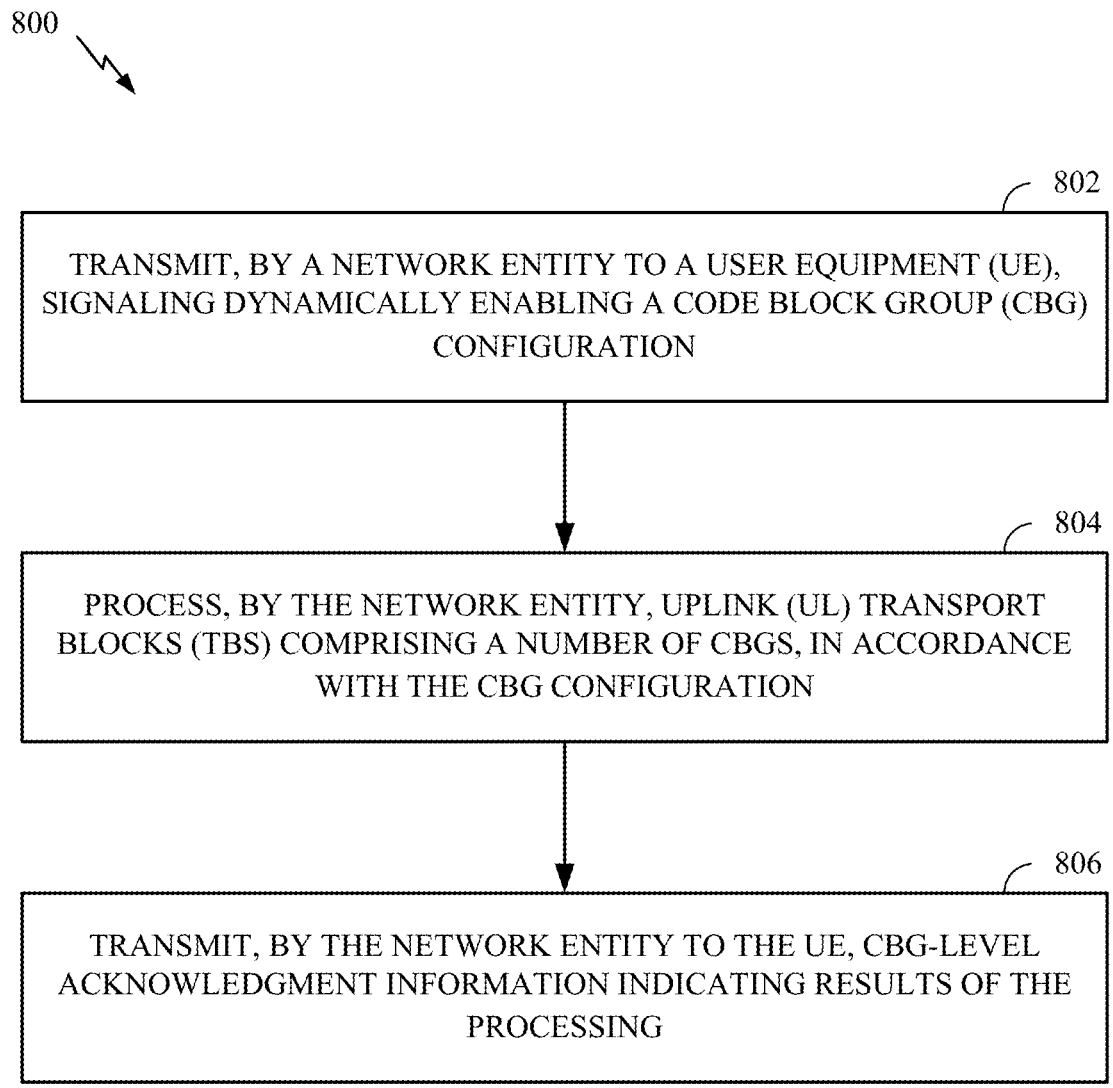
FIG. 8 is a flow diagram illustrating example operations for wireless communications by a network entity, in accordance with certain aspects of the present disclosure.

FIG. 8 is a flow diagram illustrating example operations 800 for wireless communication by a network entity, in accordance with certain aspects of the present disclosure. The operations 800 may be performed, for example, by a network entity (e.g., such as the BS 110a in the wireless communication network 100). The operations 800 may be implemented as software components that are executed and run on one or more processors (e.g., the controller/processor 240 of FIG. 2). Further, the transmission and reception of signals by the network entity in operations 800 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 800 begin, at 802, by transmitting, to a UE, signaling dynamically enabling a CBG configuration. For example, the network entity may transmit the signaling dynamically enabling the CBG configuration to the UE using antenna(s) and transmitter/transceiver components of the BS 110a shown in FIG. 1 or FIG. 2 and/or of the apparatus shown in FIG. 24.

At 804, the network entity processes UL TBs comprising a number of CBGs, in accordance with the CBG configuration. For example, the network entity may process the UL TBs, in accordance with the CBG configuration, using a processor, antenna(s) and/or transceiver components of the BS 110a shown in FIG. 1 or FIG. 2 and/or of the apparatus shown in FIG. 24.

At 806, the network entity transmits, to the UE, CBG-level acknowledgment information indicating results of processing. For example, the network entity may transmit the CBG-level acknowledgment information to the UE using antenna(s) and transmitter/transceiver components of the BS 110a shown in FIG. 1 or FIG. 2 and/or of the apparatus shown in FIG. 24.

In certain aspects, a UE receives an indication indicating a maximum number of CBGs from a network entity (e.g., in addition to signaling dynamically enabling a CBG configuration). In such cases, the number of CBGs within a TB is less than or equal to the maximum number of CBGs.

In certain aspects, enabling of a CBG configuration may be set per allocation/scenario. In certain aspects, signaling enabling the CBG configuration may also indicate a maximum number of CBGs. The signaling may include a downlink control information (DCI). The DCI indicates a CBG enabling bit (e.g., an additional DCI bit indicating enabling of the CBG configuration).

In certain aspects, when a CBG configuration is enabled based on a CBG enabling bit in a DCI for an allocation, the DCI may also indicate CBG transmission information (CBGTI) and CBG flushing out information (CBGFI) fields scheduling an initial transmission and any related retransmissions. In some cases, a length of the CBGTI and the CBGFI fields (e.g. 2, 4, 6 or 8 bits) may be based on a maximum number of CBGs.

In certain aspects, a number of bits for signaling transmitting CBG-level acknowledgment information to a network entity is based on a maximum number of CBGs (e.g., when a CBG enabling bit is set to 1). For example, when the CBG enabling bit is set to 1 in a DCI, acknowledgement (ACK)/negative acknowledgement (NACK) signaling for an allocation may have bits (e.g. 2, 4, 6 or 8 bits) based on the maximum number of CBGs.

In certain aspects, a maximum number of CBGs may be set dynamically per allocation/scenario and signaled via a DCI by a network entity. This may require two additional DCI bits (e.g., when there may be four options (i.e., 2, 4, 6 and 8) for a maximum number of CBGs) conditioned by the CBG enabling bit set to 1. In some cases, CBGTI and CBGFI fields length in this same DCI (and further DCIs scheduling retransmissions for this allocation if relevant) and corresponding ACK/NACK signaling may be defined by a signaled option for the maximum number of CBGs in the DCI.

In certain aspects, a UE may receive a different signaling indicating a maximum number of CBGs from a network entity (e.g., to reduce DCI signaling overhead). The different signaling may include a medium access element (MAC) control element (CE). The MAC-CE is a synchronous mechanism with a low latency opposed to RRC based reconfiguration that requires some link interruption. In some cases, a dynamic configuration/reconfiguration of the maximum number of CBGs by the MAC-CE may not be for every allocation.

In certain aspects, a maximum number of CBGs indicated by a MAC CE are applicable for transmissions processed after an active time associated with the MAC CE. For example, the active time may be some threshold period of time after ACK signaling for a physical downlink shared channel (PDSCH) that carried the MAC-CE. The active time is relevant for any new allocation scheduling coming after the active time.

In certain aspects, a UE may receive signaling disabling a CBG configuration from a network entity (e.g., when the CBG configuration is already enabled). In certain aspects, a UE may receive an indication indicating an updated maximum number of CBGs from a network entity. In certain aspects, the network entity may determine to disable the CBG configuration and/or update the maximum number of CBGs, based on observed ACK/NACK rate per CBG and its differences/imbalance between different CBGs.

In certain aspects, a network entity determines whether to enable or disable a CBG configuration and/or a maximum number of CBGs, based on an output of a set of machine learning (ML) trained decision machines. One or more inputs provided to the ML trained decision machines may include an allocation size, an allocation scenario, a signal to noise ratio (SNR), a modulation and coding scheme (MCS), channel parameters, a rank indicator (RI), a channel Doppler value, a channel delay value, and/or a reference signal (RS) configuration (e.g., demodulation RS).

In certain aspects, CBG-level acknowledgment information includes a hybrid automatic retransmission request (HARQ) message including one or more HARQ ACKs or NACKs corresponding to a decoding result of each CBG. The HARQ message includes a number of HARQ ACKs and HARQ NACKs equal to a maximum number of CBGs.

Techniques described herein have several advantages. For example, the techniques may improve an applicability of a CBG feature (e.g., due to improved efficiency of a CBG-based system with respect to no CBG usage option). The techniques may also reduce signaling overhead and lower scheduling complexity for a network entity. These and other advantages of operations shown in FIGS. 5-8 may be understood with reference to FIGS. 9-20.

Figure 9:
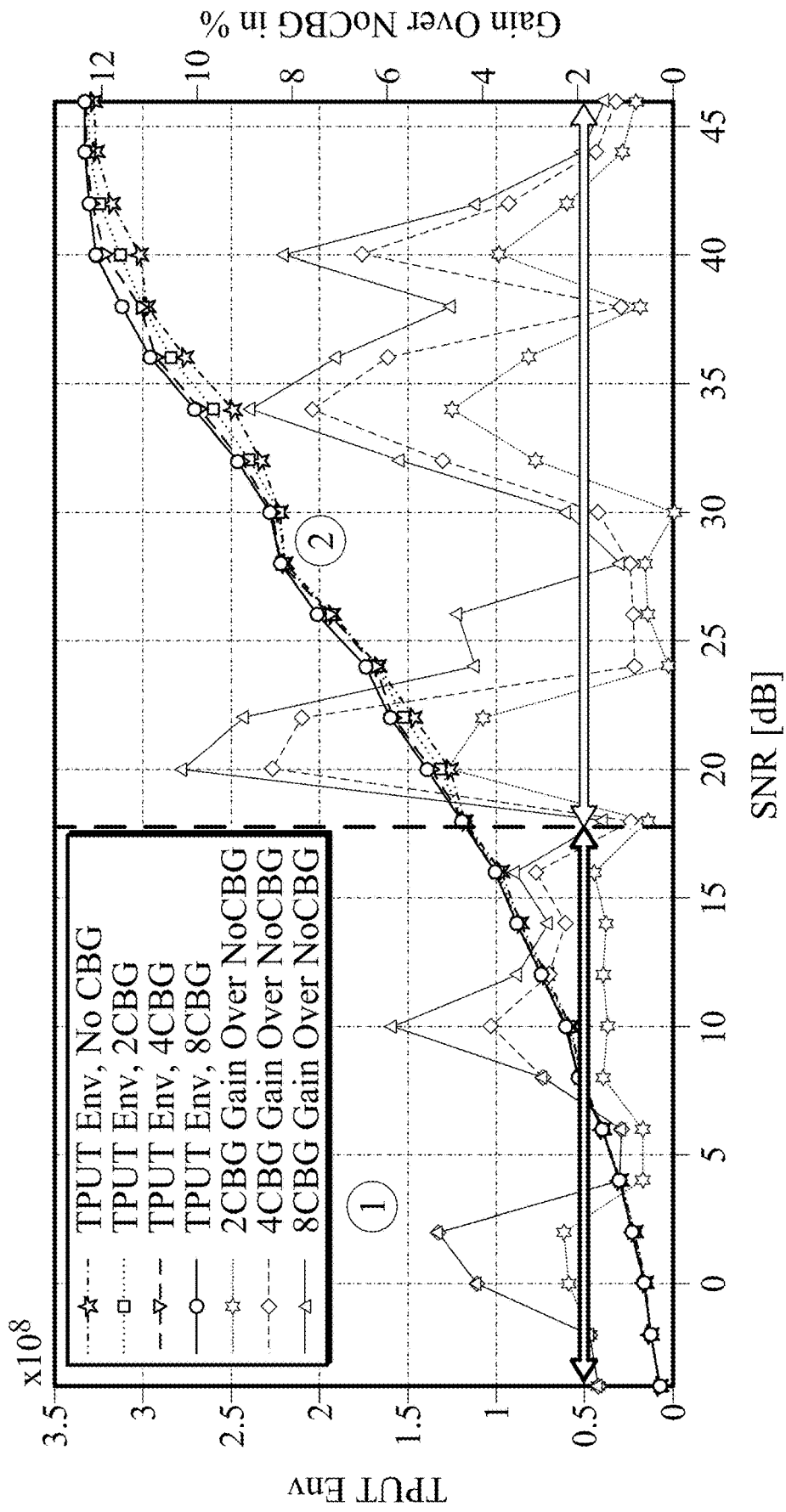
FIG. 9 illustrates example accumulated throughput (TPUT) of eight hybrid automatic retransmission request (HARQ) processes for different maximum number of CBGs in a CBG-based system and a system with no CBG configuration, in accordance with certain aspects of the present disclosure.

FIG. 9 illustrates accumulated throughput (TPUT) of eight HARQ processes for different maximum number of CBGs (2, 4, and 8) in a CBG-based system and a system with no CBG configuration. As illustrated, a first signal to noise ratio (SNR) region (1) is characterized by low potential gains for the CBG-based system (e.g., over a system with no CBG configuration). In such cases, when a network entity considers signaling overhead penalty and CBG related scheduling complexity at the network entity, the network entity may decide to disable a CBG configuration for this region.

A second SNR region (2) is characterized by higher potential gains for the CBG-based system (which can reach up to 10% over the system with no CBG configuration). In this case, the network entity may decide to enable the CBG configuration for this region (e.g., when considering the signaling overhead penalty and the CBG related scheduling complexity), and probably settle the maximum number of CBGs to 4 (instead of 8) to benefit in terms of spectral efficiency, while reducing the signaling overhead and relaxing the scheduling complexity.

In certain aspects, a CBG-based system gain over a system with no CBG configuration may be determined based on multiple parameters. As illustrated in FIG. 10, the multiple parameters may include precoding information, demodulator information, channel information, delay spread (DS) information, velocity/speed information (e.g., user speed based on Doppler frequency shift information), DMRS configuration information, modulation information, bandwidth information, SNR information, HARQ information, among others.

In certain aspects, a CBG-based system gain over a system with no CBG configuration may vary based on an allocation size and a speed.

Figure 11:
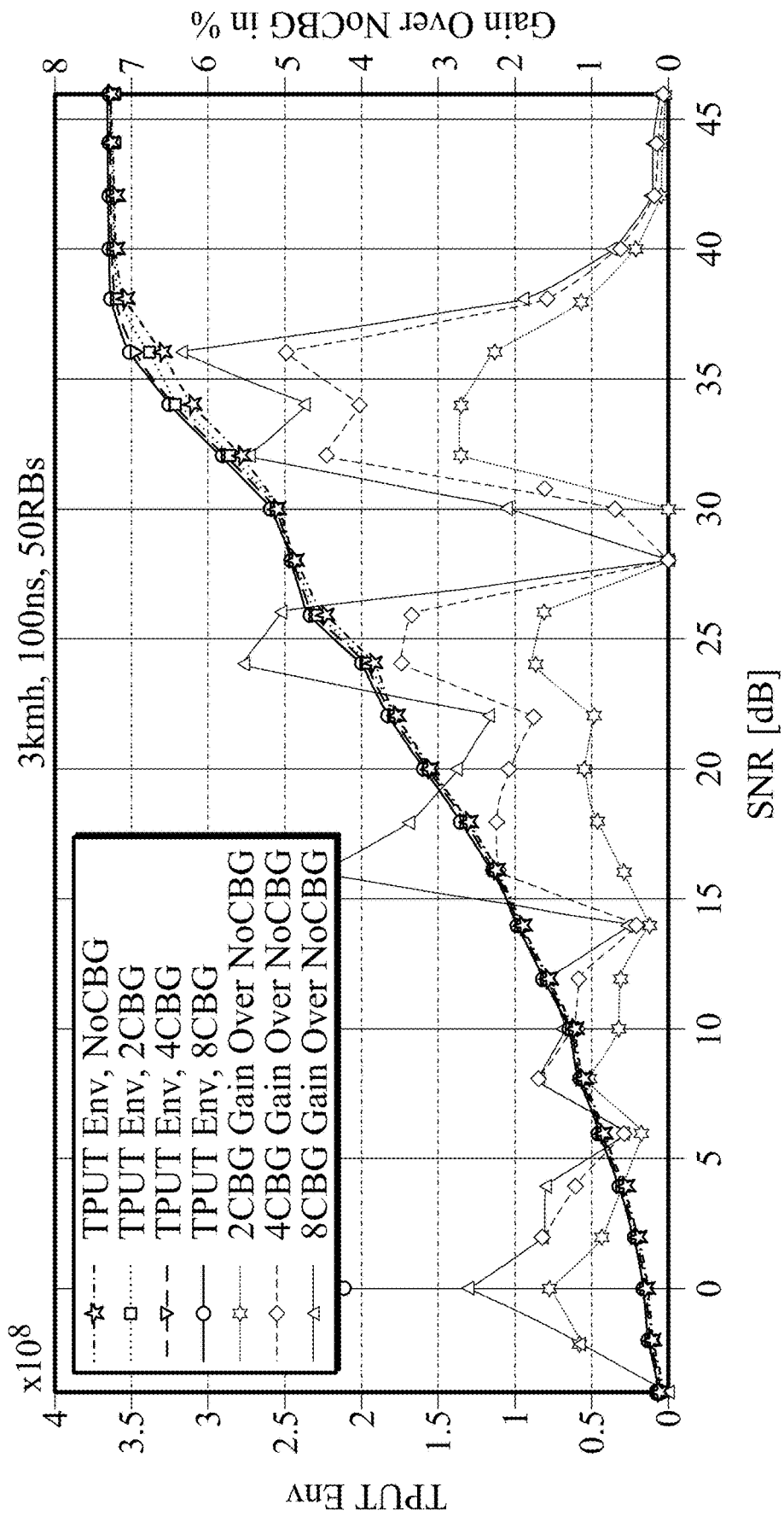
FIG. 11 illustrates example CBG-based system gain over a system with no CBG configuration when a speed is 3 kilometers per hour (kmh) and an allocation size is 50 resource blocks (RBs), in accordance with certain aspects of the present disclosure.

FIG. 11 illustrates a CBG-based system gain over a system with no CBG configuration when a speed is 3 kilometers per hour (kmh) and an allocation size is 50 resource blocks (RBs). As illustrated, a portion of SNR region is characterized by a high potential gain for the CBG-based system (with 2, 4, and 8 CBGs) over the system with no CBG configuration.

Figure 12:
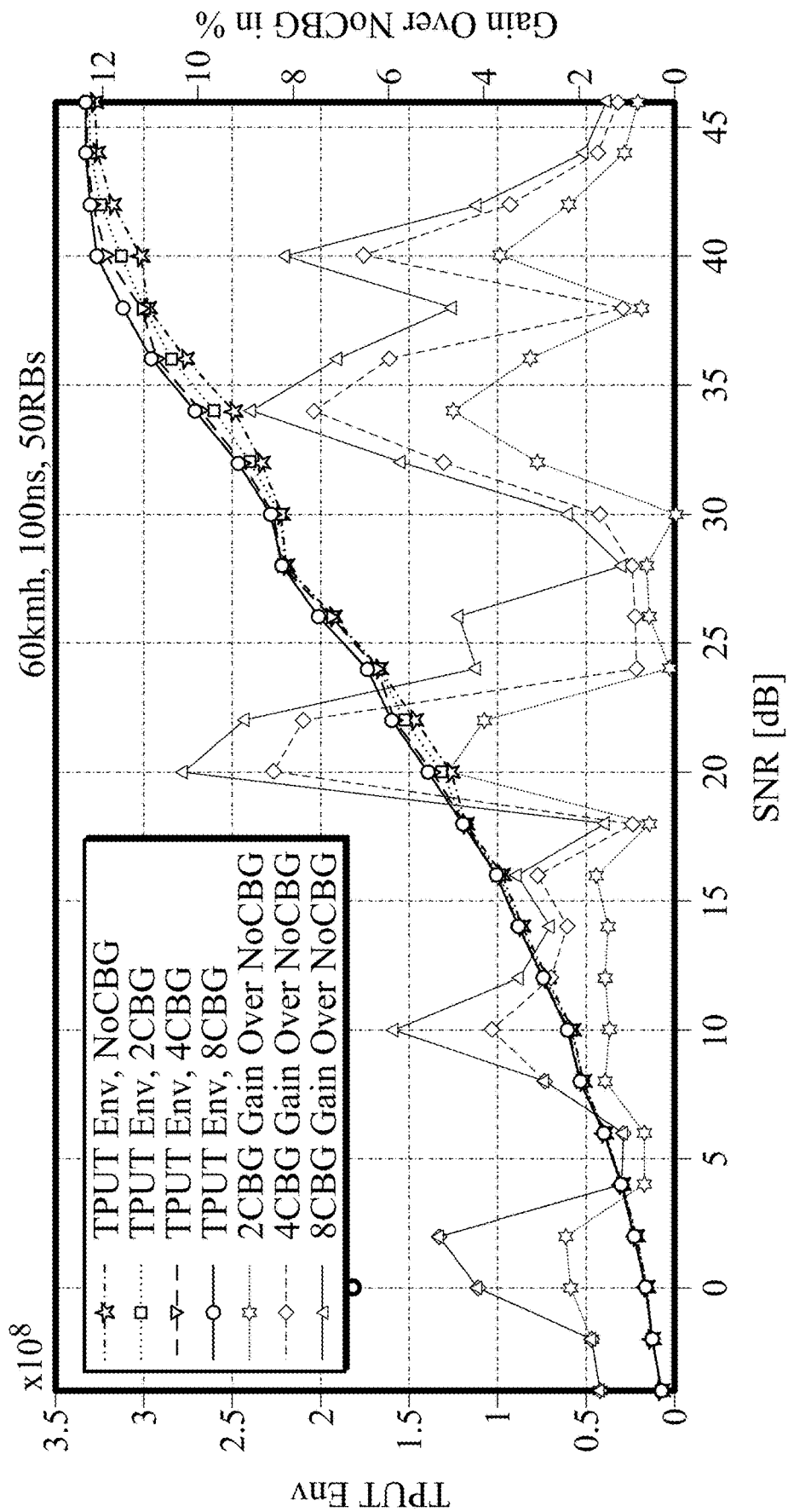
FIG. 12 illustrates example CBG-based system gain over a system with no CBG configuration when a speed is 60 kmh and an allocation size is 50 RBs, in accordance with certain aspects of the present disclosure.

FIG. 12 illustrates a CBG-based system gain over a system with no CBG configuration when a speed is 60 kmh and an allocation size is 50 RBs. As illustrated, a portion of SNR region is characterized by a high potential gain for the CBG-based system (with 2, 4, and 8 CBGs) over the system with no CBG configuration.

Figure 13:
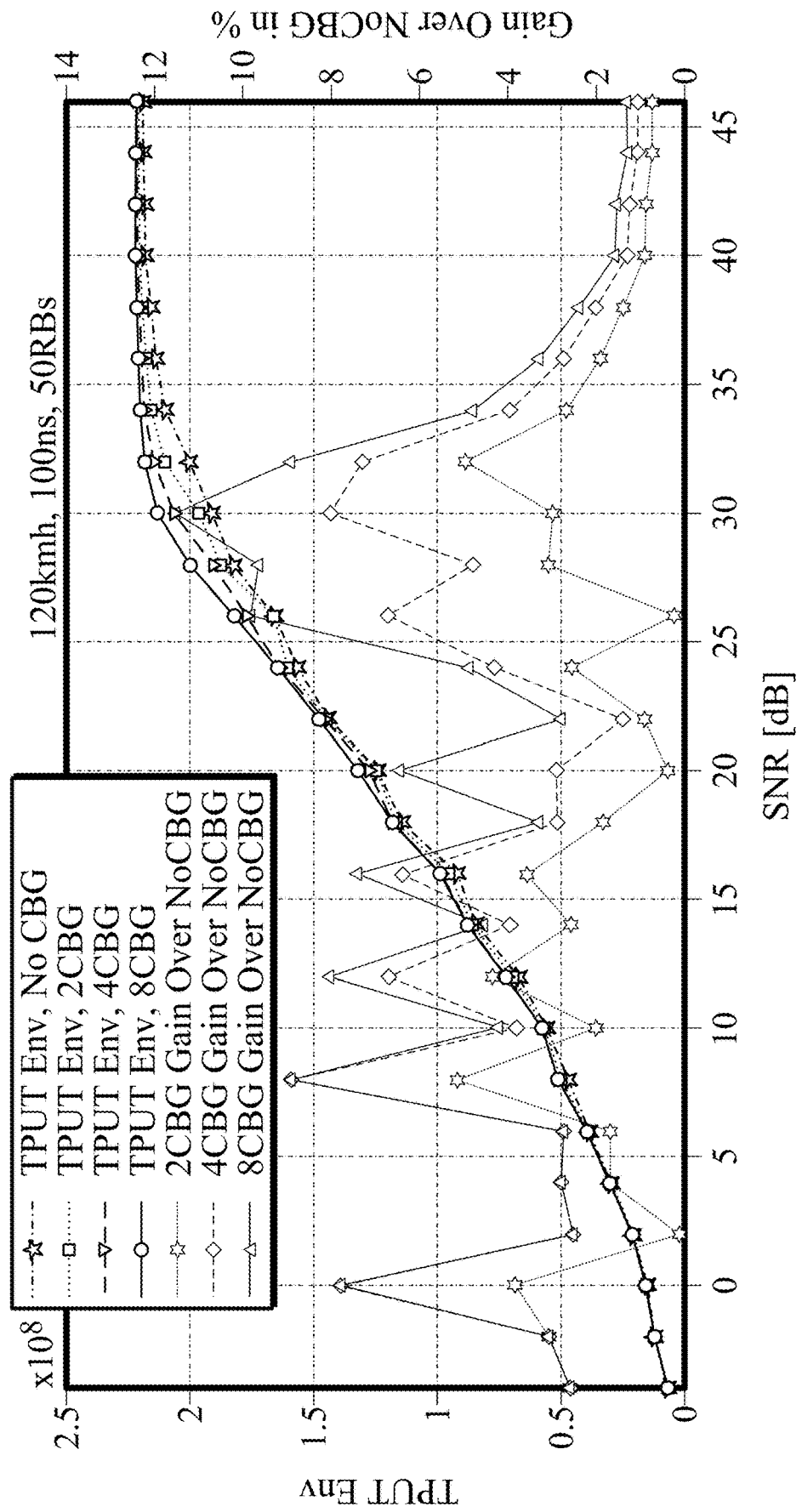
FIG. 13 illustrates example CBG-based system gain over a system with no CBG configuration when a speed is 120 kmh and an allocation size is 50 RBs, in accordance with certain aspects of the present disclosure.

FIG. 13 illustrates a CBG-based system gain over a system with no CBG configuration when a speed is 120 kmh and an allocation size is 50 RBs. As illustrated, a portion of SNR region is characterized by a high potential gain for the CBG-based system (with 2, 4, and 8 CBGs) over the system with no CBG configuration.

Figure 14:
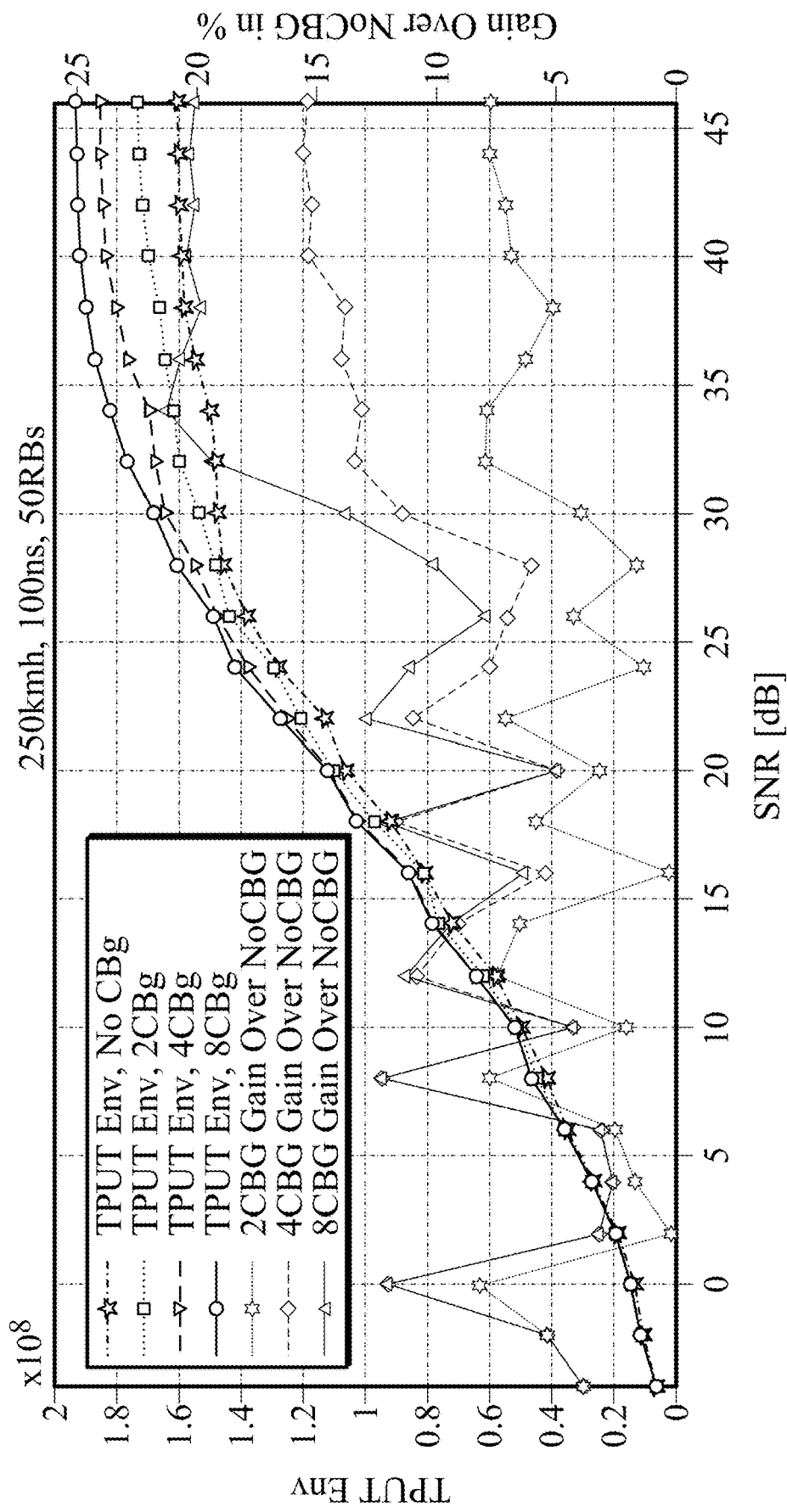
FIG. 14 illustrates example CBG-based system gain over a system with no CBG configuration when a speed is 250 kmh and an allocation size is 50 RBs, in accordance with certain aspects of the present disclosure.

FIG. 14 illustrates a CBG-based system gain over a system with no CBG configuration when a speed is 250 kmh and an allocation size is 50 RBs. As illustrated, a portion of SNR region is characterized by a high potential gain for the CBG-based system (with 2, 4, and 8 CBGs) over the system with no CBG configuration.

Figure 15:
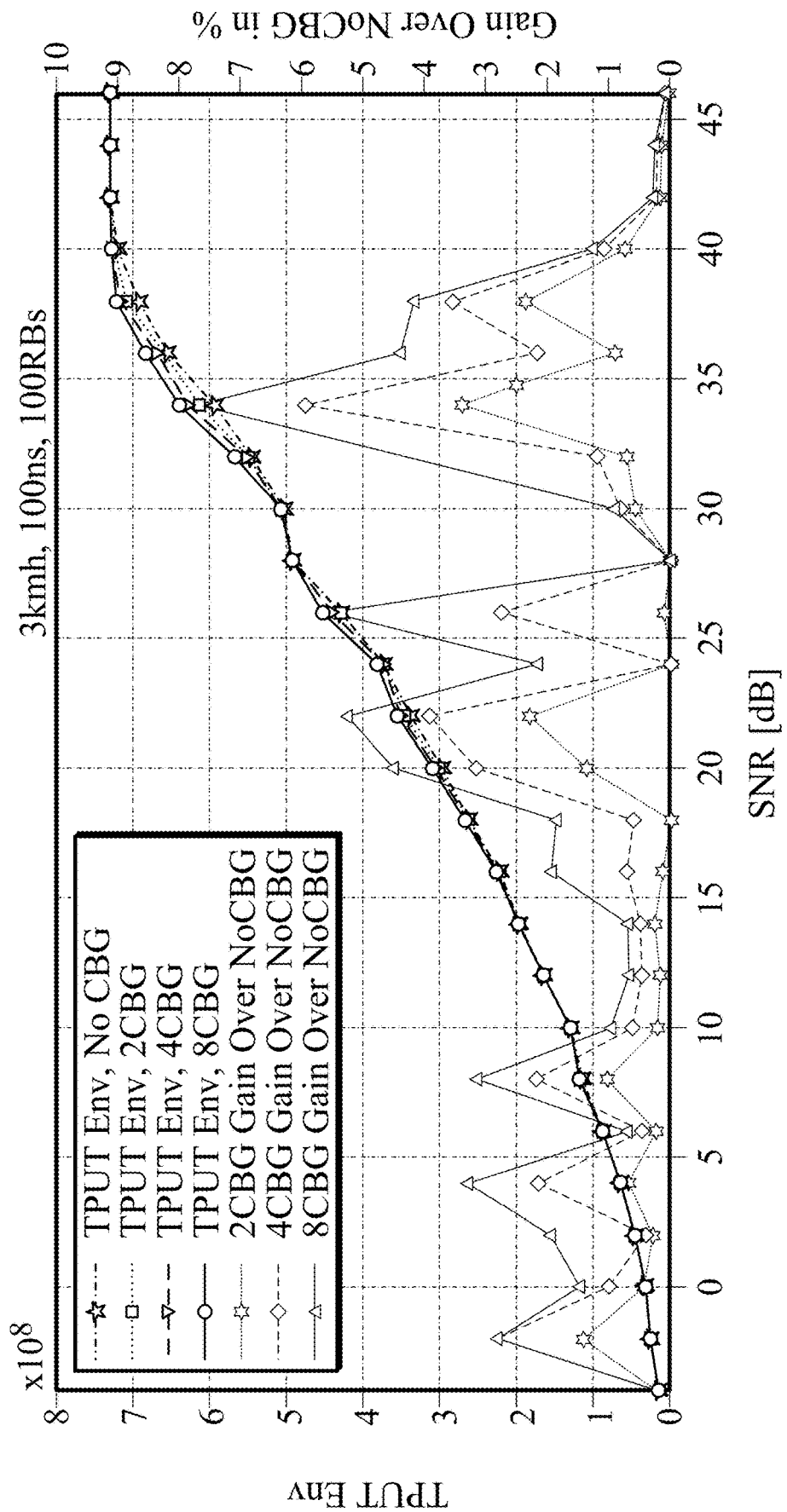
FIG. 15 illustrates example CBG-based system gain over a system with no CBG configuration when a speed is 3 kmh and an allocation size is 100 RBs, in accordance with certain aspects of the present disclosure.

FIG. 15 illustrates a CBG-based system gain over a system with no CBG configuration when a speed is 3 kmh and an allocation size is 100 RBs. As illustrated, a portion of SNR region is characterized by a high potential gain for the CBG-based system (with 2, 4, and 8 CBGs) over the system with no CBG configuration.

Figure 16:
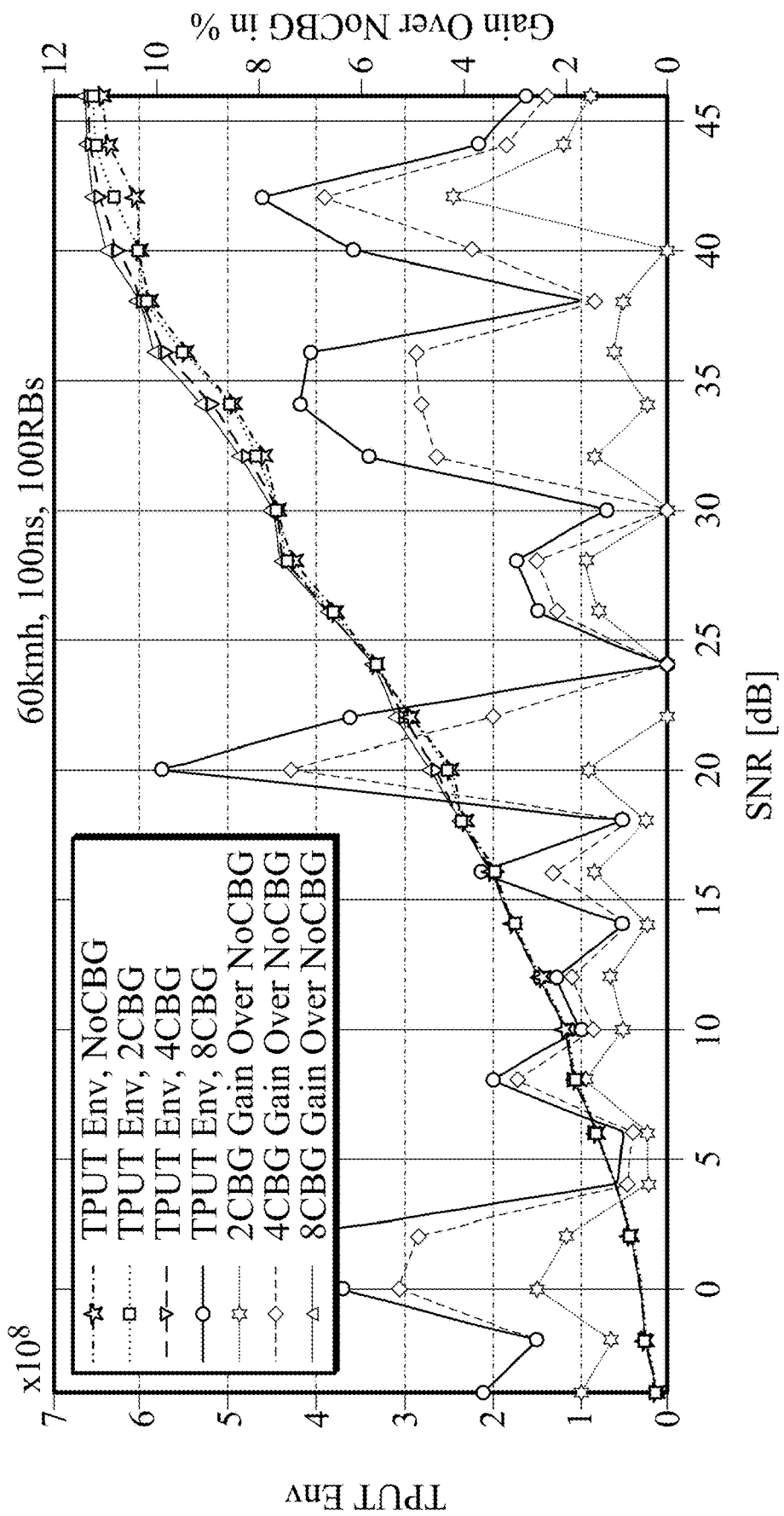
FIG. 16 illustrates example CBG-based system gain over a system with no CBG configuration when a speed is 60 kmh and an allocation size is 100 RBs, in accordance with certain aspects of the present disclosure.

FIG. 16 illustrates a CBG-based system gain over a system with no CBG configuration when a speed is 60 kmh and an allocation size is 100 RBs. As illustrated, a portion of SNR region is characterized by a high potential gain for the CBG-based system (with 2, 4, and 8 CBGs) over the system with no CBG configuration.

Figure 17:
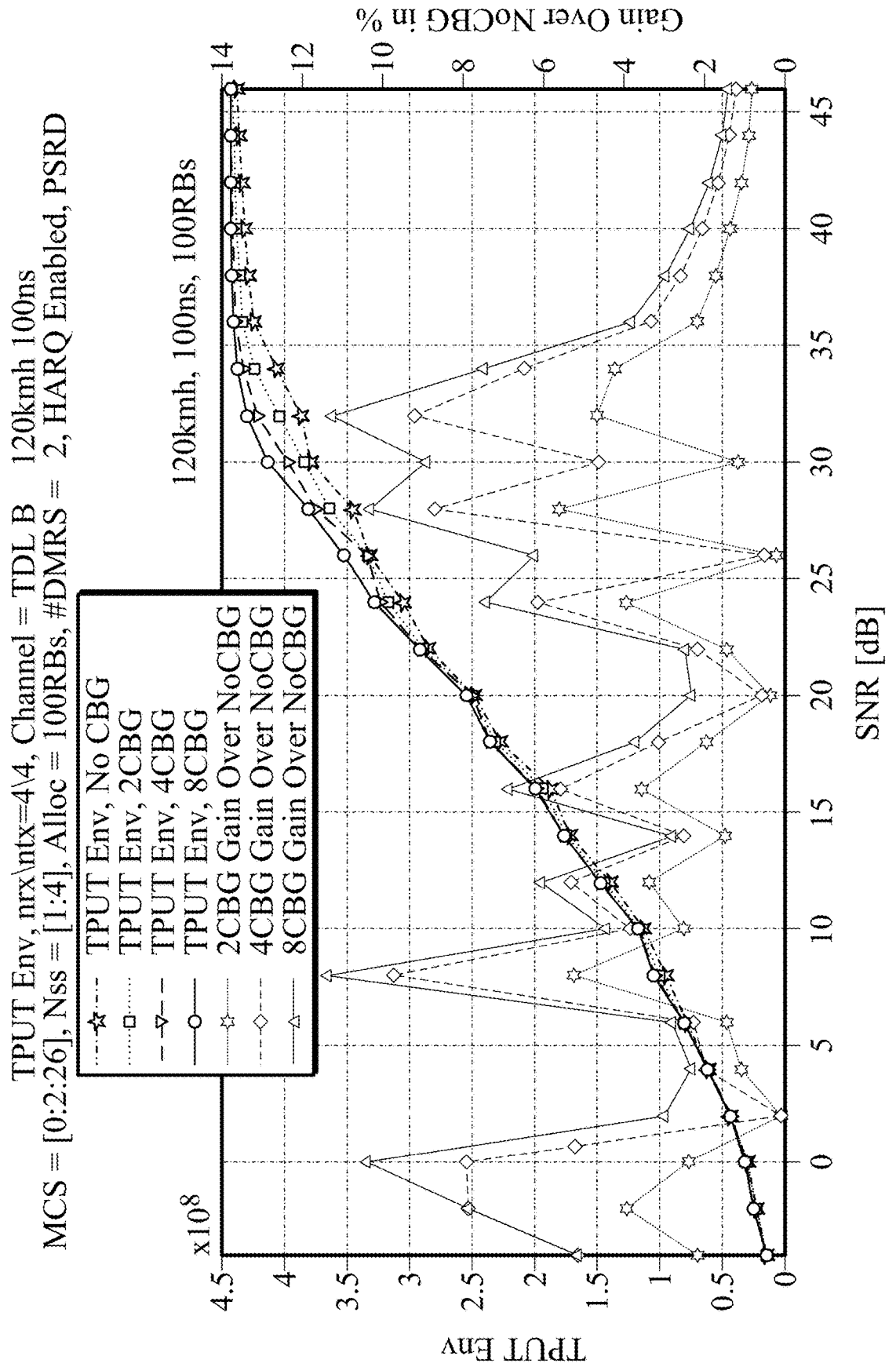
FIG. 17 illustrates example CBG-based system gain over a system with no CBG configuration when a speed is 120 kmh and an allocation size is 100 RBs, in accordance with certain aspects of the present disclosure.

FIG. 17 illustrates a CBG-based system gain over a system with no CBG configuration when a speed is 120 kmh and an allocation size is 100 RBs. As illustrated, a portion of SNR region is characterized by a high potential gain for the CBG-based system (with 2, 4, and 8 CBGs) over the system with no CBG configuration.

Figure 18:
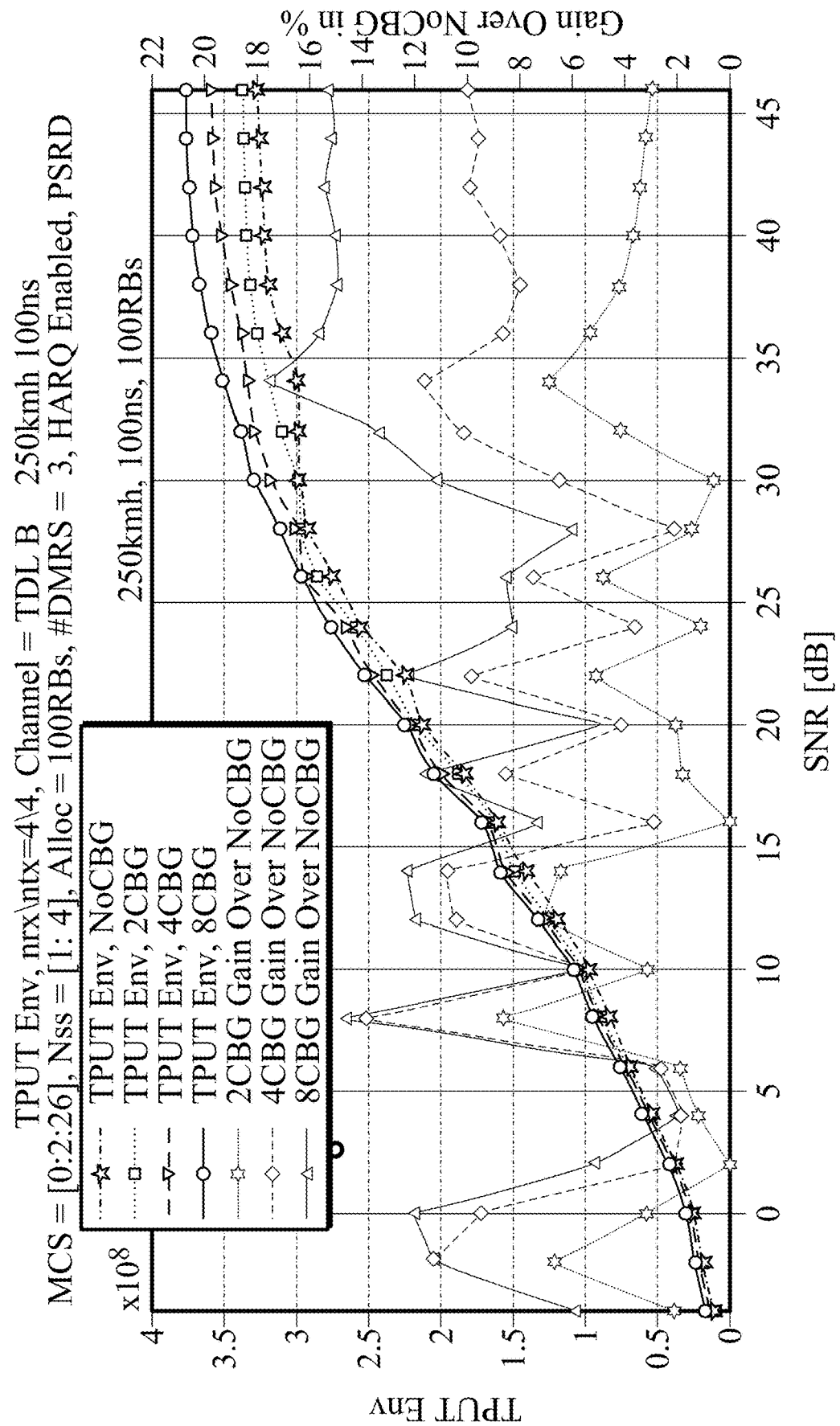
FIG. 18 illustrates example CBG-based system gain over a system with no CBG configuration when a speed is 250 kmh and an allocation size is 100 RBs, in accordance with certain aspects of the present disclosure.

FIG. 18 illustrates a CBG-based system gain over a system with no CBG configuration when a speed is 250 kmh and an allocation size is 100 RBs. As illustrated, a portion of 4, and 8 CBGs) over the system with no CBG configuration.

Figure 19:
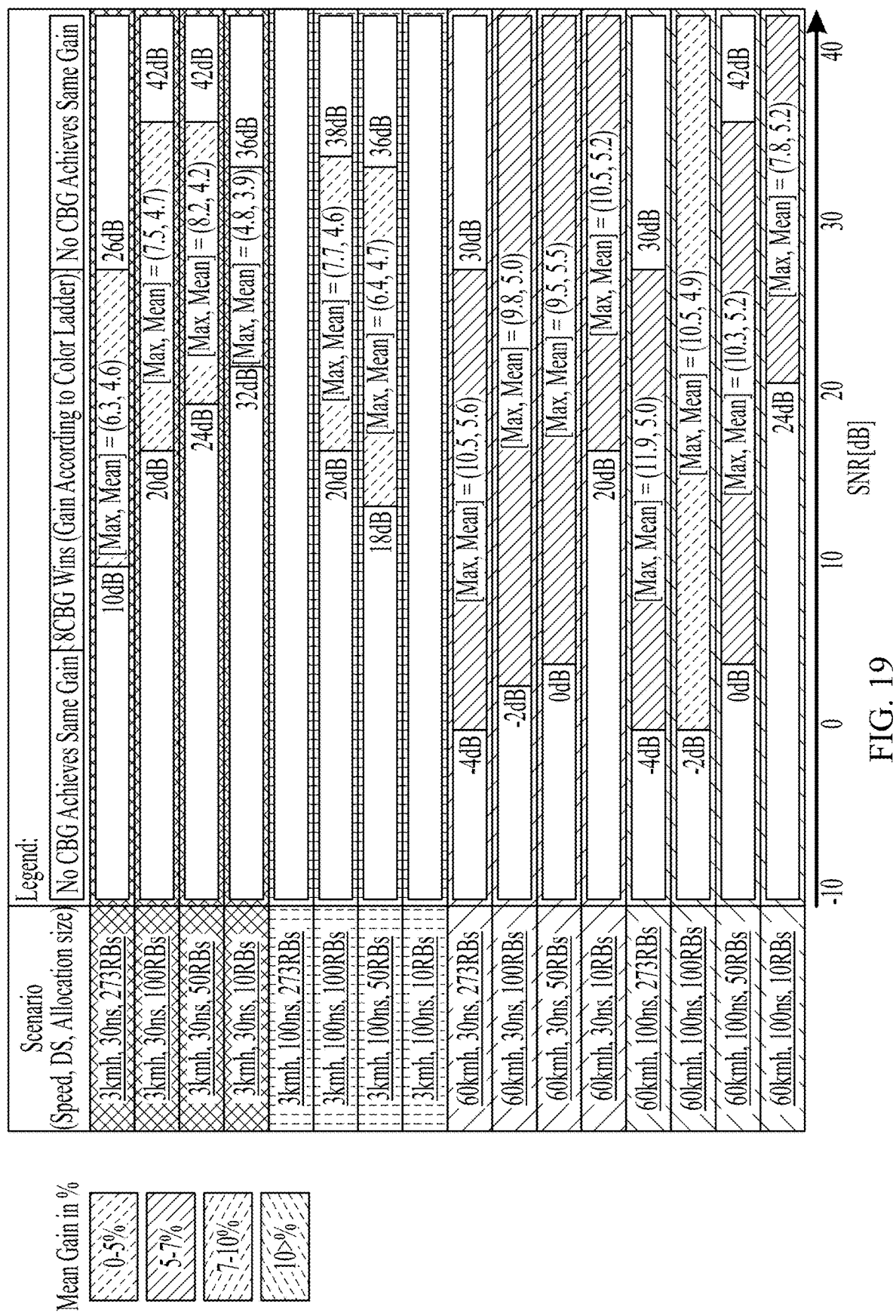
FIG. 19 illustrates example summary table of CBG-based system gains for scenarios with a first set of values, in accordance with certain aspects of the present disclosure.
Figure 20:
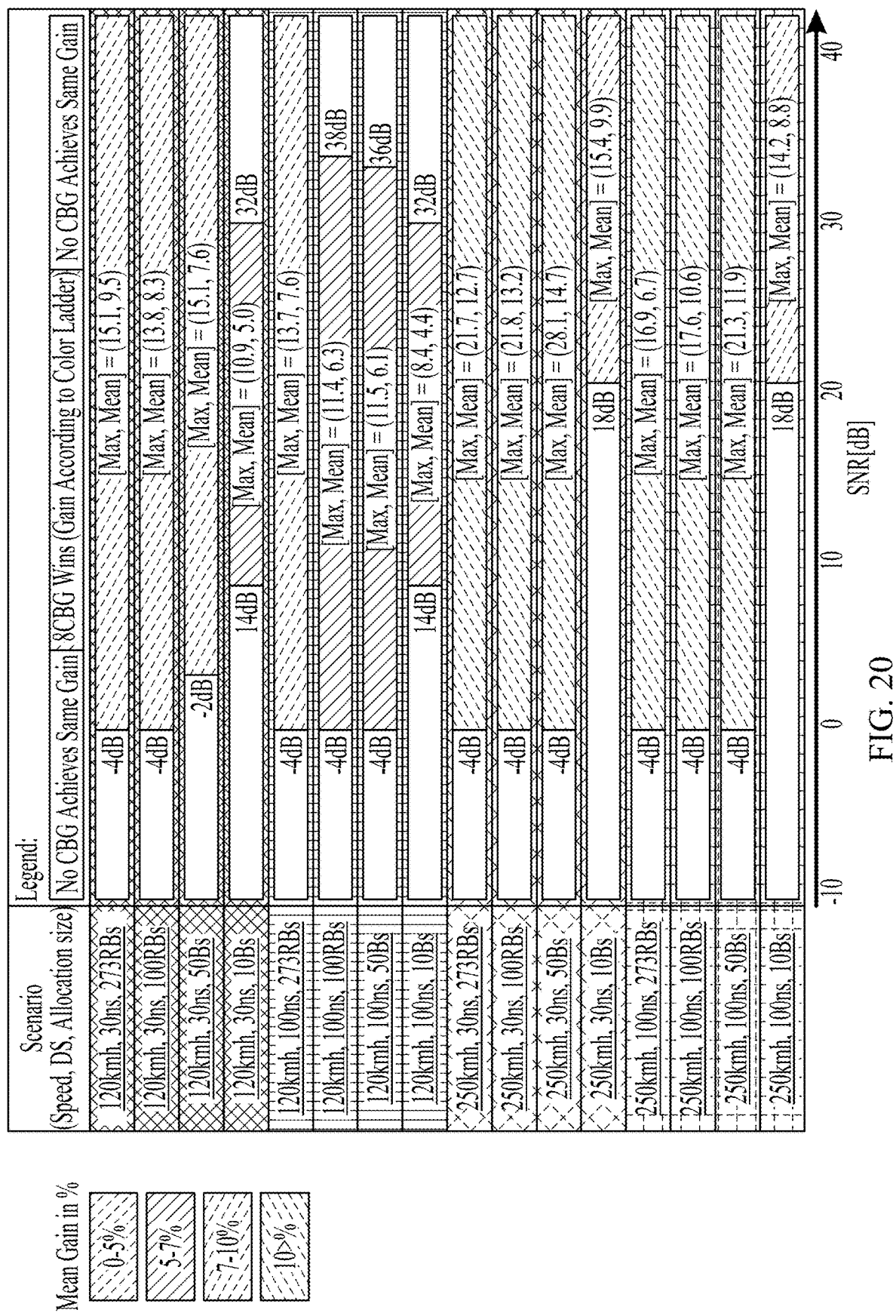
FIG. 20 illustrates example summary table of CBG-based system gains for scenarios with a second set of values, in accordance with certain aspects of the present disclosure.

FIGS. 19-20 illustrate summary tables of CBG-based system gains over a system with no CBG configuration (shown in FIGS. 11-18) for different channel conditions and scenarios (e.g., speed, DS, and allocation size). As per the summary tables, the CBG-based system (e.g., with 8 CBGs) gain over the system with no CBG configuration increases for higher speeds. Also, the CBG-based system efficiency increases as allocation size increases, as well as MCS and RI increases (which introduces more CBs per allocation). Furthermore, the CBG-based system efficiency may increase when there is an imbalance between decoding probabilities of different CBs, which are usually related to channel conditions/Doppler and chest error.

The summary tables further indicate that a potential gain from enabling CBG-based system can be quite low/negligible for certain SNR regions and below some SNR threshold. Accordingly, the CBG-based system may not be enabled in these regions, especially when considering the involved scheduling complexity and signaling overhead that is associated with the CBG-based system. Furthermore, for some SNR regions, a different maximum number of CBGs may achieve similar gains over a system with no CBG configuration. Accordingly, it may be desirable to use less number of CBGs for reduced signaling overhead, and maybe allow some scheduling complexity relaxation without significantly compromising the achievable TPUT gain.

In some cases, the techniques described herein may use dynamic signaling of a maximum number of CBG because for small allocation cases in low SNR, there may usually be only a small number of CBs (in some cases not enough for even 1 CB per CBG), but a number of bits in DCI and for ACK/NACK signaling may still be defined by a configured maximal number of CBGs. Accordingly, for such cases, dynamic CBG enabling/disabling and signaling of maximum number of CGBs is beneficial. For example, a CBG configuration may be activated/enabled and a maximum number of CBGs may be determined and indicated, based on a minimal potential TPUT gain threshold/requirement for an underlying communication scenario.

Example Wireless Communication Devices

Figure 21:
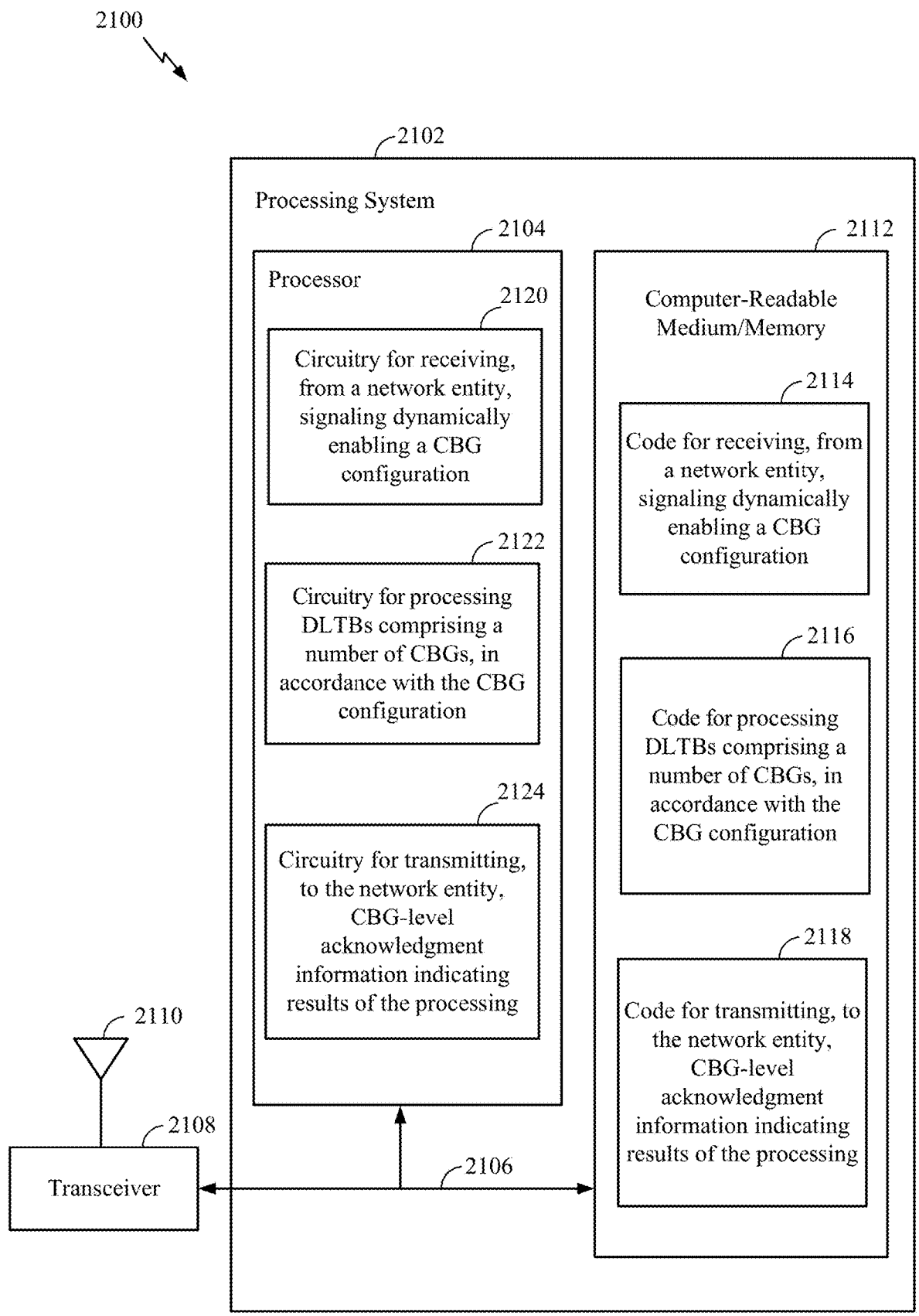
FIG. 21 illustrates a communications device that may include various components configured to perform operations for the techniques disclosed herein, in accordance with certain aspects of the present disclosure.

FIG. 21 illustrates a communications device 2100 that may include various components (e.g., corresponding to means-plus-function components) configured to perform operations for the techniques disclosed herein, such as the operations illustrated in FIG. 5. The communications device 2100 includes a processing system 2102 coupled to a transceiver 2108 (e.g., a transmitter and/or a receiver). The transceiver 2108 is configured to transmit and receive signals for the communications device 2100 via an antenna 2110, such as the various signals as described herein. The processing system 2102 is configured to perform processing functions for the communications device 2100, including processing signals received and/or to be transmitted by the communications device 2100.

The processing system 2102 includes a processor 2104 coupled to a computer-readable medium/memory 2112 via a bus 2106. In certain aspects, the computer-readable medium/memory 2112 is configured to store instructions (e.g., a computer-executable code) that when executed by the processor 2104, cause the processor 2104 to perform the operations illustrated in FIG. 5, or other operations for performing the various techniques discussed herein. In certain aspects, computer-readable medium/memory 2112 stores code 2114 for receiving, code 2116 for processing, and code 2118 for transmitting. The code 2114 for receiving may include code for receiving, from a network entity, signaling dynamically enabling a CBG configuration. The code 2116 for processing may include code for processing DL TBs comprising a number of CBGs, in accordance with the CBG configuration. The code 2118 for transmitting may include code for transmitting, to the network entity, CBG-level acknowledgment information indicating results of the processing.

The processor 2104 may include circuitry configured to implement the code stored in the computer-readable medium/memory 2112, such as for performing the operations illustrated in FIG. 5, as well as other operations for performing the various techniques discussed herein. For example, the processor 2104 includes circuitry 2120 for receiving, circuitry 2122 for processing, and circuitry 2124 for transmitting. The circuitry 2120 for receiving may include circuitry for receiving, from a network entity, signaling dynamically enabling a CBG configuration. The circuitry 2122 for processing may include circuitry for processing DL TBs comprising a number of CBGs, in accordance with the CBG configuration. The circuitry 2124 for transmitting may include circuitry for transmitting, to the network entity, CBG-level acknowledgment information indicating results of the processing.

Figure 22:
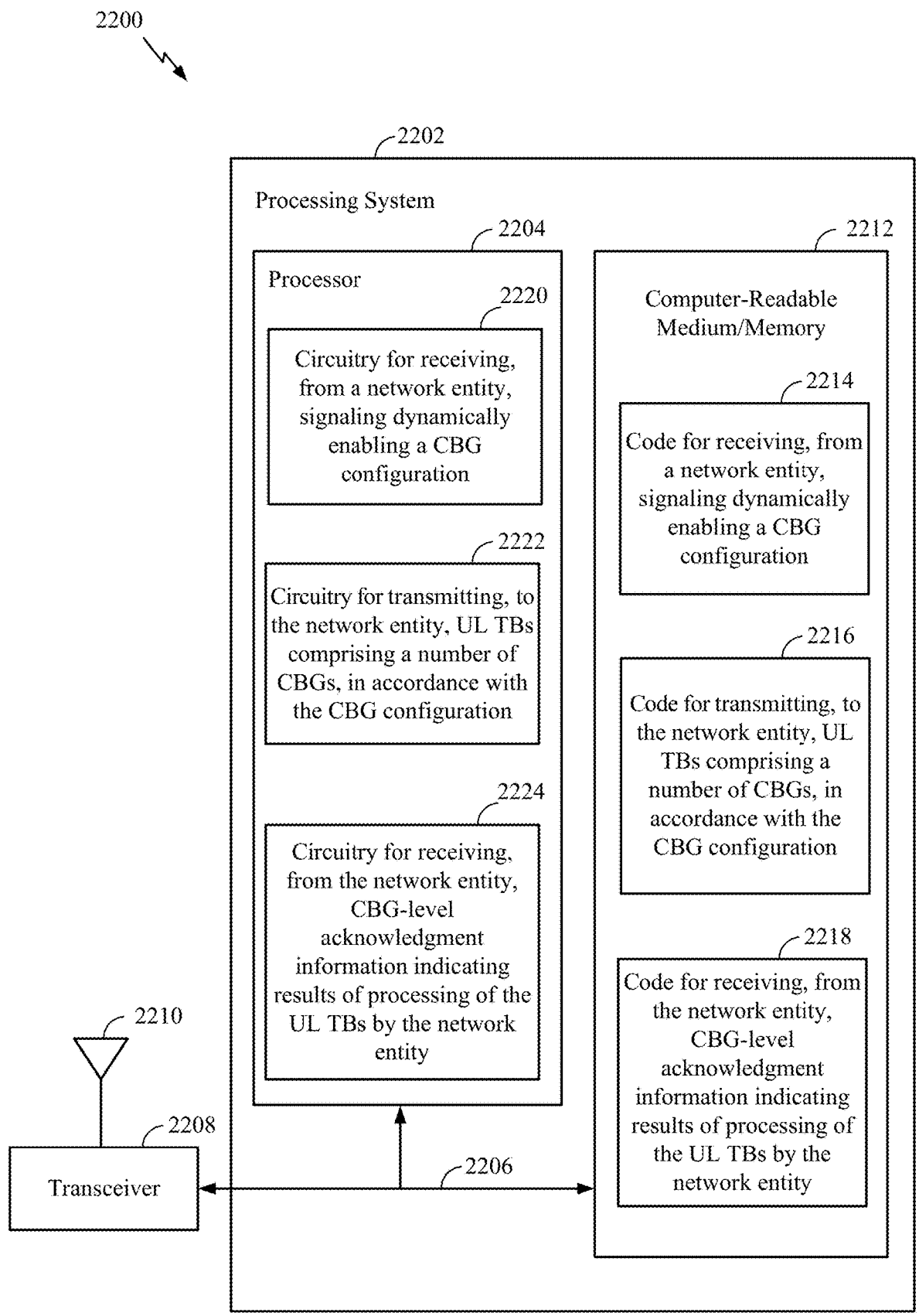
FIG. 22 illustrates a communications device that may include various components configured to perform operations for the techniques disclosed herein, in accordance with certain aspects of the present disclosure.

FIG. 22 illustrates a communications device 2200 that may include various components (e.g., corresponding to means-plus-function components) configured to perform operations for the techniques disclosed herein, such as the operations illustrated in FIG. 6. The communications device 2200 includes a processing system 2202 coupled to a transceiver 2208 (e.g., a transmitter and/or a receiver). The transceiver 2208 is configured to transmit and receive signals for the communications device 2200 via an antenna 2210, such as the various signals as described herein. The processing system 2202 is configured to perform processing functions for the communications device 2200, including processing signals received and/or to be transmitted by the communications device 2200.

The processing system 2202 includes a processor 2204 coupled to a computer-readable medium/memory 2212 via a bus 2206. In certain aspects, the computer-readable medium/memory 2212 is configured to store instructions (e.g., a computer-executable code) that when executed by the processor 2204, cause the processor 2204 to perform the operations illustrated in FIG. 6, or other operations for performing the various techniques discussed herein. In certain aspects, computer-readable medium/memory 2212 stores code 2214 for receiving, code 2216 for transmitting, and code 2218 for receiving. The code 2214 for receiving may include code for receiving, from a network entity, signaling dynamically enabling a CBG configuration. The code 2216 for transmitting may include code for transmitting, to the network entity, UL TBs comprising a number of CBGs, in accordance with the CBG configuration. The code 2218 for receiving may include code for receiving, from the network entity, CBG-level acknowledgment information indicating results of processing of the UL TBs by the network entity.

The processor 2204 may include circuitry configured to implement the code stored in the computer-readable medium/memory 2212, such as for performing the operations illustrated in FIG. 6, as well as other operations for performing the various techniques discussed herein. For example, the processor 2204 includes circuitry 2220 for receiving, circuitry 2222 for transmitting, and circuitry 2224 for receiving. The circuitry 2220 for receiving may include circuitry for receiving, from a network entity, signaling dynamically enabling a CBG configuration. The circuitry 2222 for transmitting may include circuitry for transmitting, to the network entity, UL TBs comprising a number of CBGs, in accordance with the CBG configuration. The circuitry 2224 for receiving may include circuitry for receiving, from the network entity, CBG-level acknowledgment information indicating results of processing of the UL TBs by the network entity.

Figure 23:
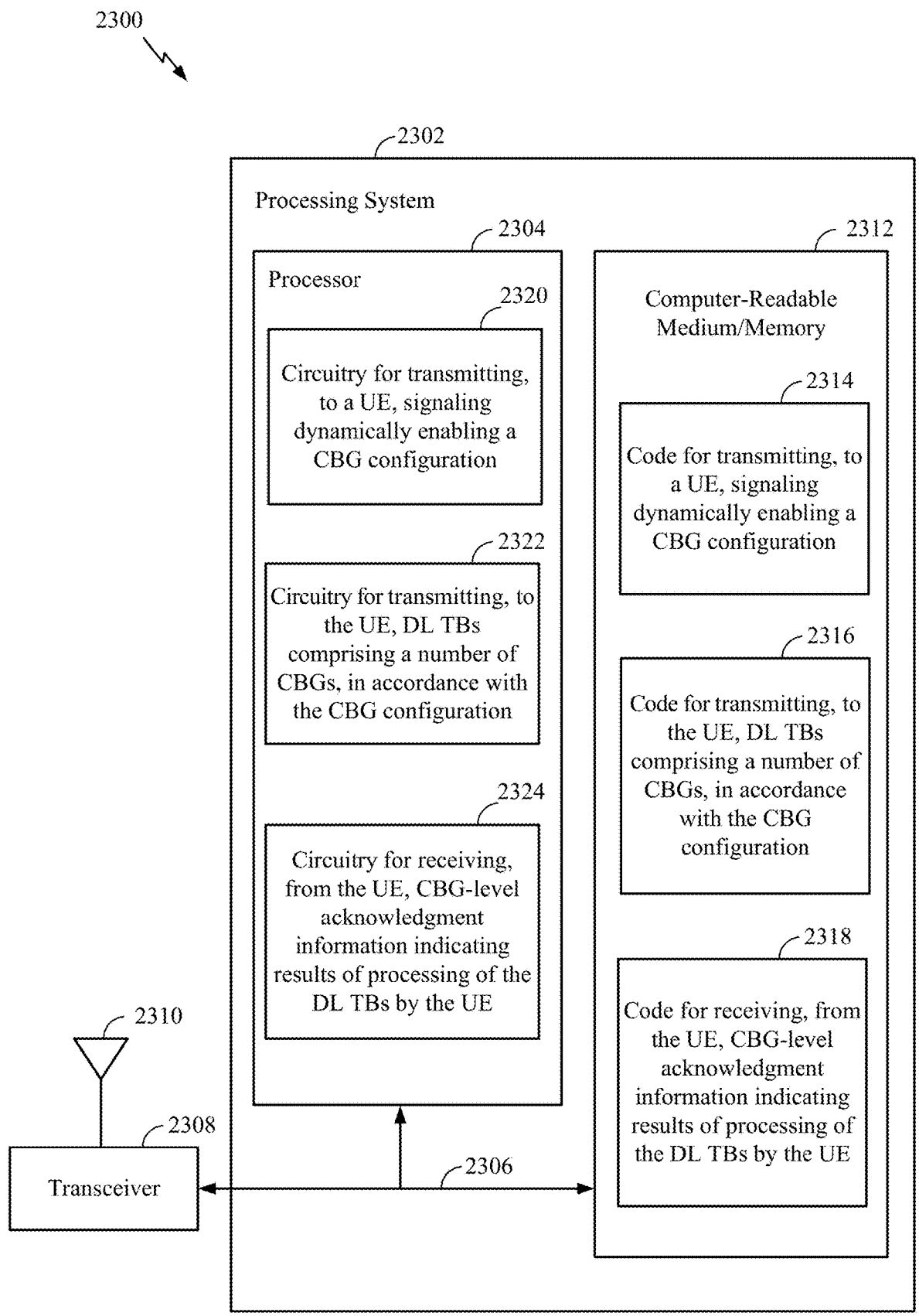
FIG. 23 illustrates a communications device that may include various components configured to perform operations for the techniques disclosed herein, in accordance with certain aspects of the present disclosure.

FIG. 23 illustrates a communications device 2300 that may include various components (e.g., corresponding to means-plus-function components) configured to perform operations for the techniques disclosed herein, such as the operations illustrated in FIG. 7. The communications device 2300 includes a processing system 2302 coupled to a transceiver 2408 (e.g., a transmitter and/or a receiver). The transceiver 2308 is configured to transmit and receive signals for the communications device 2300 via an antenna 2310, such as the various signals as described herein. The processing system 2302 is configured to perform processing functions for the communications device 2300, including processing signals received and/or to be transmitted by the communications device 2300.

The processing system 2302 includes a processor 2304 coupled to a computer-readable medium/memory 2312 via a bus 2306. In certain aspects, the computer-readable medium/memory 2312 is configured to store instructions (e.g., a computer-executable code) that when executed by the processor 2304, cause the processor 2304 to perform the operations illustrated in FIG. 7, or other operations for performing the various techniques discussed herein. In certain aspects, computer-readable medium/memory 2312 stores code 2314 for transmitting, code 2316 for transmitting, and code 2318 for receiving. The code 2314 for transmitting may include code for transmitting, to a UE, signaling dynamically enabling a CBG configuration. The code 2316 for transmitting may include code for transmitting, to the UE, DL TBs comprising a number of CBGs, in accordance with the CBG configuration. The code 2318 for receiving may include code for receiving, from the UE, CBG-level acknowledgment information indicating results of processing of the DL TBs by the UE.

The processor 2304 may include circuitry configured to implement the code stored in the computer-readable medium/memory 2312, such as for performing the operations illustrated in FIG. 7, as well as other operations for performing the various techniques discussed herein. For example, the processor 2304 includes circuitry 2320 for transmitting, circuitry 2322 for transmitting, and circuitry 2324 for receiving. The circuitry 2320 for transmitting may include circuitry for transmitting, to a UE, signaling dynamically enabling a CBG configuration. The circuitry 2322 for transmitting may include circuitry for transmitting, to the UE, DL TBs comprising a number of CBGs, in accordance with the CBG configuration. The circuitry 2324 for receiving may include circuitry for receiving, from the UE, CBG-level acknowledgment information indicating results of processing of the DL TBs by the UE.

Figure 24:
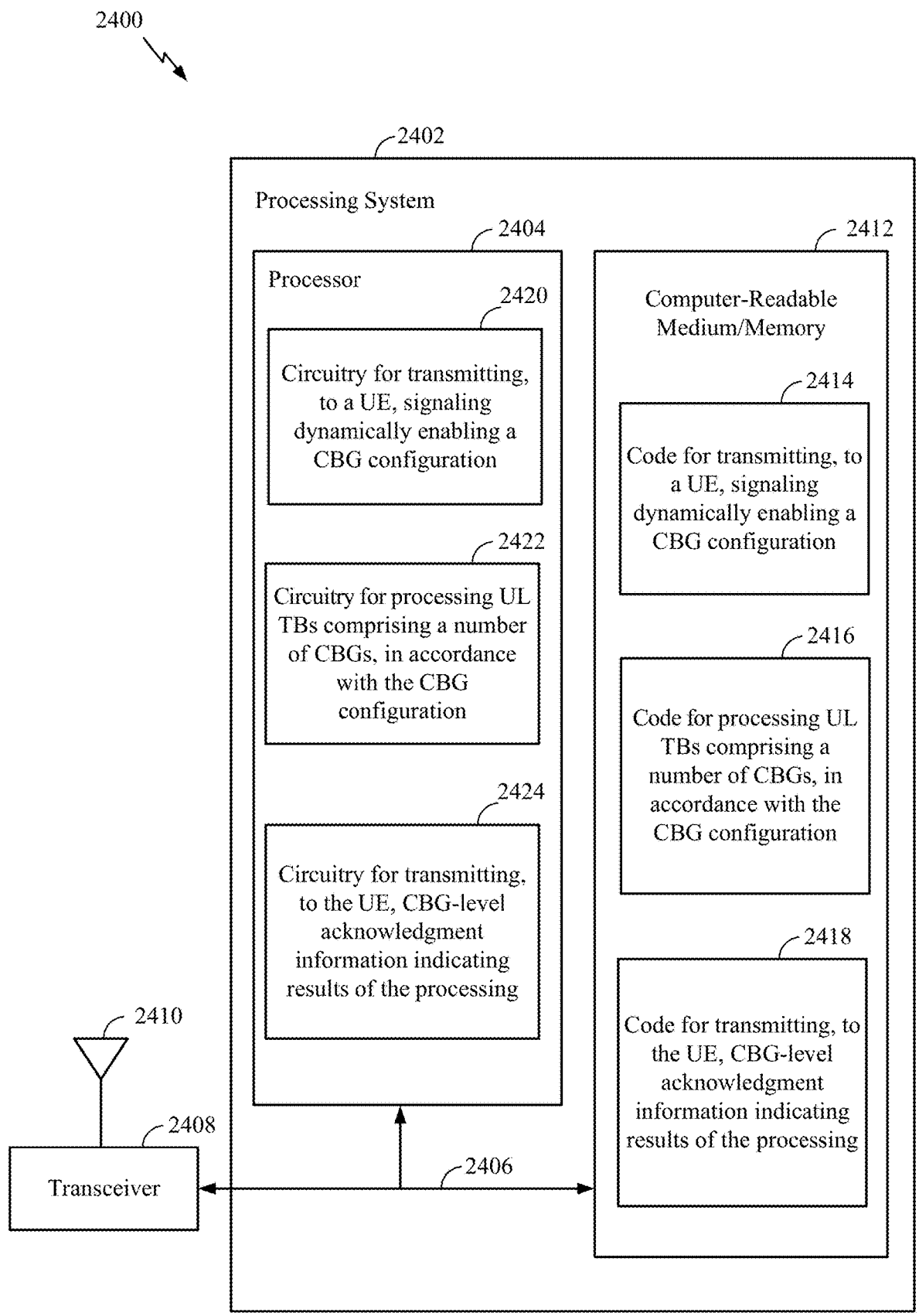
FIG. 24 illustrates a communications device that may include various components configured to perform operations for the techniques disclosed herein, in accordance with certain aspects of the present disclosure.

FIG. 24 illustrates a communications device 2400 that may include various components (e.g., corresponding to means-plus-function components) configured to perform operations for the techniques disclosed herein, such as the operations illustrated in FIG. 8. The communications device 2400 includes a processing system 2402 coupled to a transceiver 2408 (e.g., a transmitter and/or a receiver). The transceiver 2408 is configured to transmit and receive signals for the communications device 2400 via an antenna 2410, such as the various signals as described herein. The processing system 2402 is configured to perform processing functions for the communications device 2400, including processing signals received and/or to be transmitted by the communications device 2400.

The processing system 2402 includes a processor 2404 coupled to a computer-readable medium/memory 2412 via a bus 2406. In certain aspects, the computer-readable medium/memory 2412 is configured to store instructions (e.g., a computer-executable code) that when executed by the processor 2404, cause the processor 2404 to perform the operations illustrated in FIG. 8, or other operations for performing the various techniques discussed herein. In certain aspects, computer-readable medium/memory 2412 stores code 2414 for transmitting, code 2416 for processing, and code 2418 for transmitting. The code 2414 for transmitting may include code for transmitting, to a UE, signaling dynamically enabling a CBG configuration. The code 2416 for processing may include code for processing UL TBs comprising a number of CBGs, in accordance with the CBG configuration. The code 2418 for transmitting may include code for transmitting, to the UE, CBG-level acknowledgment information indicating results of the processing.

The processor 2404 may include circuitry configured to implement the code stored in the computer-readable medium/memory 2412, such as for performing the operations illustrated in FIG. 8, as well as other operations for performing the various techniques discussed herein. For example, the processor 2404 includes circuitry 2420 for transmitting, circuitry 2422 for processing, and circuitry 2424 for transmitting. The circuitry 2420 for transmitting may include circuitry for transmitting, to a UE, signaling dynamically enabling a CBG configuration. The circuitry 2422 for processing may include circuitry for processing UL TBs comprising a number of CBGs, in accordance with the CBG configuration. The circuitry 2424 for transmitting may include circuitry for transmitting, to the UE, CBG-level acknowledgment information indicating results of the processing.

EXAMPLE ASPECTS

Implementation examples are described in the following numbered aspects.

In a first aspect, a method for wireless communications by a user equipment (UE), comprising: receiving, from a network entity, signaling dynamically enabling a code block group (CBG) configuration; processing downlink (DL) transport blocks (TBs) comprising a number of CBGs, in accordance with the CBG configuration; and transmitting, to the network entity, CBG-level acknowledgment information indicating results of the processing.

In a second aspect, alone or in combination with the first aspect, receiving, from the network entity, an indication indicating a maximum number of CBGs.

In a third aspect, alone or in combination with one or more of the first and second aspects, the number of CBGs is less than or equal to the maximum number of CBGs.

In a fourth aspect, alone or in combination with one or more of the first through third aspects, the signaling dynamically enables the CBG configuration and indicates the maximum number of CBGs.

In a fifth aspect, alone or in combination with one or more of the first through fourth aspects, the signaling comprises a downlink control information (DCI), and wherein the DCI indicates a CBG enabling bit.

In a sixth aspect, alone or in combination with one or more of the first through fifth aspects, the DCI further indicates CBG transmission information (CBGTI) and CBG flushing out information (CBGFI) scheduling an initial transmission and retransmissions.

In a seventh aspect, alone or in combination with one or more of the first through sixth aspects, a length of the CBGTI and the CBGFI is based on the maximum number of CBGs.

In an eighth aspect, alone or in combination with one or more of the first through seventh aspects, a number of bits for signaling transmitting the acknowledgment information to the network entity is based on the maximum number of CBGs, when the CBG enabling bit is set to 1.

In a ninth aspect, alone or in combination with one or more of the first through eighth aspects, receiving, from the network entity, a different signaling indicating a maximum number of CBGs.

In a tenth aspect, alone or in combination with one or more of the first through ninth aspects, the different signaling comprises a medium access element (MAC) control element (CE).

In an eleventh aspect, alone or in combination with one or more of the first through tenth aspects, the maximum number of CBGs indicated by the MAC CE are applicable for transmissions processed after an active time associated with the MAC CE.

In a twelfth aspect, alone or in combination with the first aspect, receiving, from the network entity, signaling disabling the CBG configuration.

In a thirteenth aspect, alone or in combination with the first aspect, the CBG-level acknowledgment information comprises a hybrid automatic retransmission request (HARQ) message comprising one or more HARQ acknowledgements (ACKs) or negative acknowledgements (NACKs) corresponding to a decoding result of each CBG.

In a fourteenth aspect, alone or in combination with one or more of the first and thirteenth aspects, the HARQ message comprises a number of HARQ ACKs and HARQ NACKs equal to a maximum number of CBGs.

In a fifteenth aspect, a method for wireless communications by a user equipment (UE), comprising: receiving, from a network entity, signaling dynamically enabling a code block group (CBG) configuration; transmitting, to the network entity, uplink (UL) transport blocks (TBs) comprising a number of CBGs, in accordance with the CBG configuration; and receiving, from the network entity, CBG-level acknowledgment information indicating results of processing of the UL TBs by the network entity.

In a sixteenth aspect, alone or in combination with the fifteenth aspect, receiving, from the network entity, an indication indicating a maximum number of CBGs.

In a seventeenth aspect, alone or in combination with one or more of the fifteenth and sixteenth aspects, the number of CBGs is less than or equal to the maximum number of CBGs.

In an eighteenth aspect, alone or in combination with one or more of the fifteenth through seventeenth aspects, the signaling dynamically enables the CBG configuration and indicates the maximum number of CBGs.

In a nineteenth aspect, alone or in combination with one or more of the fifteenth through eighteenth aspects, the signaling comprises a downlink control information (DCI), and wherein the DCI indicates a CBG enabling bit.

In a twentieth aspect, a method for wireless communications by a network entity, comprising: transmitting, to a user equipment (UE), signaling dynamically enabling a code block group (CBG) configuration; transmitting, to the UE, downlink (DL) transport blocks (TBs) comprising a number of CBGs, in accordance with the CBG configuration; and receiving, from the UE, CBG-level acknowledgment information indicating results of processing of the DL TBs by the UE.

In a twenty-first aspect, alone or in combination with the twentieth aspect, transmitting, to the UE, an indication indicating a maximum number of CBGs.

In a twenty-second aspect, alone or in combination with one or more of the twentieth and twenty-first aspects, determining whether to enable the CBG configuration and the maximum number of CBGs based on a set of machine learning (ML) trained decision machines.

In a twenty-third aspect, alone or in combination with one or more of the twentieth to twenty-second aspects, determining whether to enable the CBG configuration and the maximum number of CBGs based on at least one of: a resource allocation size, a signal to noise ratio (SNR), a modulation and coding scheme (MCS), a rank indicator (RI), a channel Doppler value, a channel delay, or a reference signal (RS) configuration.

In a twenty-fourth aspect, alone or in combination with the twentieth aspect, determining whether to disable the CBG configuration based on the CBG-level acknowledgment information; and sending, to the UE, signaling disabling the CBG configuration, based on the determination.

In a twenty-fifth aspect, alone or in combination with one or more of the twentieth and twenty-fourth aspects, determining whether to update the maximum number of CBGs based on the CBG-level acknowledgment information; and sending, to the UE, a new indication indicating an updated maximum number of CBGs, based on the determination.

In a twenty-sixth aspect, a method for wireless communications by a network entity, comprising: transmitting, to a user equipment (UE), signaling dynamically enabling a code block group (CBG) configuration; processing uplink (UL) transport blocks (TBs) comprising a number of CBGs, in accordance with the CBG configuration; and transmitting, to the UE, CBG-level acknowledgment information indicating results of the processing.

In a twenty-seventh aspect, alone or in combination with the twenty-sixth aspect, transmitting, to the UE, an indication indicating a maximum number of CBGs.

In a twenty-eighth aspect, alone or in combination with one or more of the twenty-sixth and twenty-seventh aspects, determining whether to enable the CBG configuration and the maximum number of CBGs based on a set of machine learning (ML) trained decision machines.

In a twenty-ninth aspect, alone or in combination with one or more of the twenty-sixth to twenty-eighth aspects, determining whether to enable the CBG configuration and the maximum number of CBGs based on at least one of: a resource allocation size, a signal to noise ratio (SNR), a modulation and coding scheme (MCS), a rank indicator (RI), a channel Doppler value, a channel delay, or a reference signal (RS) configuration.

In a thirtieth, alone or in combination with the twenty-sixth aspect, determining whether to disable the CBG configuration based on the CBG-level acknowledgment information; and sending, to the UE, signaling disabling the CBG configuration, based on the determination.

An apparatus for wireless communication, comprising at least one processor; and a memory coupled to the at least one processor, the memory comprising code executable by the at least one processor to cause the apparatus to perform the method of any of the first through thirtieth aspects.

An apparatus comprising means for performing the method of any of the first through thirtieth aspects.

A computer readable medium storing computer executable code thereon for wireless communications that, when executed by at least one processor, cause an apparatus to perform the method of any of the first through thirtieth aspects.

ADDITIONAL CONSIDERATIONS

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
receiving, from a network entity, signaling dynamically enabling a code block group (CBG) configuration that is configured per resource allocation;
processing downlink (DL) transport blocks (TBs) comprising a number of CBGs, in accordance with the CBG configuration; and
transmitting, to the network entity, CBG-level acknowledgment information indicating results of the processing.

2. The method of claim 1, further comprising receiving, from the network entity, an indication indicating a maximum number of CBGs.

3. The method of claim 2, wherein the number of CBGs is less than or equal to the maximum number of CBGs.

4. The method of claim 2, wherein the signaling dynamically enables the CBG configuration and indicates the maximum number of CBGs.

5. The method of claim 4, wherein the signaling comprises a downlink control information (DCI), and wherein the DCI indicates a CBG enabling bit.

6. The method of claim 5, wherein the DCI further indicates CBG transmission information (CBGTI) and CBG flushing out information (CBGFI) scheduling an initial transmission and retransmissions.

7. The method of claim 6, wherein a length of the CBGTI and the CBGFI is based on the maximum number of CBGs.

8. The method of claim 5, wherein a number of bits for signaling transmitting the acknowledgment information to the network entity is based on the maximum number of CBGs, when the CBG enabling bit is set to 1.

9. The method of claim 1, further comprising receiving, from the network entity, a different signaling indicating a maximum number of CBGs.

10. The method of claim 9, wherein the different signaling comprises a medium access element (MAC) control element (CE).

11. The method of claim 10, wherein the maximum number of CBGs indicated by the MAC CE are applicable for transmissions processed after an active time associated with the MAC CE.

12. The method of claim 1, further comprising receiving, from the network entity, signaling disabling the CBG configuration.

13. The method of claim 1, wherein the CBG-level acknowledgment information comprises a hybrid automatic retransmission request (HARQ) message comprising one or more HARQ acknowledgements (ACKs) or negative acknowledgements (NACKs) corresponding to a decoding result of each CBG.

14. The method of claim 13, wherein the HARQ message comprises a number of HARQ ACKs and HARQ NACKs equal to a maximum number of CBGs.

15. A method for wireless communications by a user equipment (UE), comprising:
receiving, from a network entity, signaling dynamically enabling a code block group (CBG) configuration that is configured per resource allocation;
transmitting, to the network entity, uplink (UL) transport blocks (TBs) comprising a number of CBGs, in accordance with the CBG configuration; and
receiving, from the network entity, CBG-level acknowledgment information indicating results of processing of the UL TBs by the network entity.

16. The method of claim 15, further comprising receiving, from the network entity, an indication indicating a maximum number of CBGs.

17. The method of claim 16, wherein the number of CBGs is less than or equal to the maximum number of CBGs.

18. The method of claim 16, wherein the signaling dynamically enables the CBG configuration and indicates the maximum number of CBGs.

19. The method of claim 18, wherein the signaling comprises a downlink control information (DCI), and wherein the DCI indicates a CBG enabling bit.

20. A method for wireless communications by a network entity, comprising:
transmitting, to a user equipment (UE), signaling dynamically enabling a code block group (CBG) configuration that is configured per resource allocation;
transmitting, to the UE, downlink (DL) transport blocks (TBs) comprising a number of CBGs, in accordance with the CBG configuration; and
receiving, from the UE, CBG-level acknowledgment information indicating results of processing of the DL TBs by the UE.

21. The method of claim 20, further comprising transmitting, to the UE, an indication indicating a maximum number of CBGs.

22. The method of claim 21, further comprising determining whether to enable the CBG configuration and the maximum number of CBGs based on a set of machine learning (ML) trained decision machines.

23. The method of claim 21, further comprising determining whether to enable the CBG configuration and the maximum number of CBGs based on at least one of: a resource allocation size, a signal to noise ratio (SNR), a modulation and coding scheme (MCS), a rank indicator (RI), a channel Doppler value, a channel delay, or a reference signal (RS) configuration.

24. The method of claim 21, further comprising:
determining whether to update the maximum number of CBGs based on the CBG-level acknowledgment information; and
sending, to the UE, a new indication indicating an updated maximum number of CBGs, based on the determination.

25. The method of claim 20, further comprising:
determining whether to disable the CBG configuration based on the CBG-level acknowledgment information; and
sending, to the UE, signaling disabling the CBG configuration, based on the determination.

26. A method for wireless communications by a network entity, comprising:
transmitting, to a user equipment (UE), signaling dynamically enabling a code block group (CBG) configuration that is configured per resource allocation;
processing uplink (UL) transport blocks (TBs) comprising a number of CBGs, in accordance with the CBG configuration; and
transmitting, to the UE, CBG-level acknowledgment information indicating results of the processing.

27. The method of claim 26, further comprising transmitting, to the UE, an indication indicating a maximum number of CBGs.

28. The method of claim 27, further comprising determining whether to enable the CBG configuration and the maximum number of CBGs based on a set of machine learning (ML) trained decision machines.

29. The method of claim 27, further comprising determining whether to enable the CBG configuration and the maximum number of CBGs based on at least one of: a resource allocation size, a signal to noise ratio (SNR), a modulation and coding scheme (MCS), a rank indicator (RI), a channel Doppler value, a channel delay, or a reference signal (RS) configuration.

30. The method of claim 26, further comprising:
determining whether to disable the CBG configuration based on the CBG-level acknowledgment information; and
sending, to the UE, signaling disabling the CBG configuration, based on the determination.

* * * * *